(12) United States Patent
Zeng et al.

(10) Patent No.: US 10,433,311 B2
(45) Date of Patent: Oct. 1, 2019

(54) INFORMATION TRANSMISSION METHOD, DEVICE, AND SYSTEM FOR EFFICIENT TRANSFER OF BROADCAST INFORMATION

(71) Applicant: Huawei Technologies Co., Ltd., Shenzhen (CN)

(72) Inventors: Qinghai Zeng, Shanghai (CN); Jian Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/491,806

(22) Filed: Apr. 19, 2017

(65) Prior Publication Data

US 2017/0223690 A1 Aug. 3, 2017

Related U.S. Application Data

(63) Continuation of application No. PCT/CN2014/088964, filed on Oct. 20, 2014.

(51) Int. Cl.
*H04W 72/04* (2009.01)
*H04W 4/06* (2009.01)
(Continued)

(52) U.S. Cl.
CPC ....... *H04W 72/046* (2013.01); *H04L 27/2675* (2013.01); *H04W 4/06* (2013.01);
(Continued)

(58) Field of Classification Search
CPC ..... H04W 72/046; H04W 4/06; H04W 16/28; H04W 72/02; H04W 72/1289; H04L 27/2675
See application file for complete search history.

(56) References Cited

U.S. PATENT DOCUMENTS

| 8,798,099 B2* | 8/2014 | Larsson | H04B 7/0408 |
| | | | 343/729 |
| 2008/0132263 A1* | 6/2008 | Yu | H04J 11/0069 |
| | | | 455/515 |

(Continued)

FOREIGN PATENT DOCUMENTS

| CN | 101998260 A | 3/2011 |
| EP | 1926337 A2 | 5/2008 |

(Continued)

OTHER PUBLICATIONS

Kim et al., "Joint Scalable Coding and Routing for 60 GHz Real-Time Live HD Video Streaming Applications," IEEE Transactions on Broadcasting, vol. 59, No. 3, pp. 500-512, Institute of Electrical and Electronics Engineers, New York, New York (Sep. 2013).

*Primary Examiner* — Christopher M Crutchfield
*Assistant Examiner* — Tito Q Pham
(74) *Attorney, Agent, or Firm* — Leydig, Voit & Mayer, Ltd.

(57) ABSTRACT

Embodiments of the present invention provide an information transmission method, a device, and a system. The method includes: determining, by UE, a type of a coverage area in which the UE is located, where the type of the coverage area is a first coverage area or a second coverage area; and receiving, by the UE by using a corresponding beam according to the type of the coverage area in which the UE is located, the broadcast information sent by the network device. Therefore, when the UE is covered in the different coverage areas, the broadcast information sent by the network device can be received, and this ensures normal communication between the UE and the network device.

17 Claims, 10 Drawing Sheets

(51) Int. Cl.
*H04L 27/26* (2006.01)
*H04W 16/28* (2009.01)
*H04W 72/02* (2009.01)
*H04W 72/12* (2009.01)
*H04W 88/02* (2009.01)
*H04W 88/08* (2009.01)
*H04W 74/08* (2009.01)

(52) U.S. Cl.
CPC ............ *H04W 16/28* (2013.01); *H04W 72/02* (2013.01); *H04W 72/1289* (2013.01); *H04W 74/0833* (2013.01); *H04W 88/02* (2013.01); *H04W 88/08* (2013.01)

(56) References Cited

U.S. PATENT DOCUMENTS

| | | | |
|---|---|---|---|
| 2008/0318606 A1* | 12/2008 | Tsutsui | H04B 7/0417 455/500 |
| 2009/0185522 A1* | 7/2009 | Periyalwar | H04W 48/18 370/328 |
| 2009/0286547 A1* | 11/2009 | Tangemann | H04B 7/0408 455/452.2 |
| 2012/0113941 A1 | 5/2012 | Chung et al. | |
| 2013/0010714 A1 | 1/2013 | Kim et al. | |
| 2013/0121133 A1* | 5/2013 | Anchan | H04W 4/00 370/216 |
| 2013/0121185 A1* | 5/2013 | Li | H04W 72/046 370/252 |
| 2013/0182643 A1* | 7/2013 | Pazos | H04L 65/4076 370/328 |
| 2013/0286960 A1* | 10/2013 | Li | H04W 72/042 370/329 |
| 2015/0108362 A1* | 4/2015 | Purser | H01J 37/1475 250/396 R |
| 2015/0131536 A1 | 5/2015 | Kaur et al. | |
| 2016/0227385 A1* | 8/2016 | Ahmad | H04L 65/4061 |
| 2016/0308684 A1* | 10/2016 | Zhu | H04W 4/06 |
| 2017/0347382 A1* | 11/2017 | Ji | H04L 5/0094 |

FOREIGN PATENT DOCUMENTS

| | | |
|---|---|---|
| JP | 2014500685 A | 1/2014 |
| KR | 20080047947 A | 5/2008 |
| KR | 20110082485 A | 7/2011 |
| KR | 20120031217 A | 3/2012 |
| KR | 20120050350 A | 5/2012 |
| KR | 20130052670 A | 5/2013 |
| WO | 2014133320 A1 | 9/2014 |

* cited by examiner

INFORMATION TRANSMISSION METHOD, DEVICE, AND SYSTEM FOR EFFICIENT TRANSFER OF BROADCAST INFORMATION

CROSS-REFERENCE TO RELATED APPLICATIONS

This application is a continuation of International Application No. PCT/CN2014/088964, filed on Oct. 20, 2014, the disclosure of which is hereby incorporated by reference in its entirety.

TECHNICAL FIELD

Embodiments of the present invention relate to the field of communications technologies, and in particular, to an information transmission method, a device, and a system.

BACKGROUND

To meet a mobile broadband requirement on high-speed data transmission, people switch their focus onto a millimeter wave band. Currently, the academic community refers to a band of 30 GHz to 100 GHz as a millimeter wave band. The millimeter wave band has a large available bandwidth. For example, in a band range of 60 GHz, bandwidth that is not licensed and can be used for free in each country is approximately 7 GHz to 9 GHz. In addition, directional transmission can be implemented relatively easily in the millimeter wave band. Therefore, the millimeter wave band can implement low-interference high-confidentiality communication at an extremely high data transmission rate. A base station may use a broadcast beam or a unicast beam in a millimeter wave band to communicate with UE (User Equipment, UE for short). An area that can be scanned by the broadcast beam is referred to as a broadcast coverage area, and a unicast beam scanned by the unicast beam is generally greater than the broadcast coverage area. The area that scanned by the unicast beam is greatly larger than a broadcast coverage area. An area between the area that is scanned by the unicast beam and an area of the broadcast coverage area is referred to as a unicast broadcast area. Because a millimeter wave transmission signal is attenuated fast, broadcast information sent by the base station to the UE is not applicable to transmission of an omnidirectional antenna. Therefore, how to receive broadcast information when the UE is in the broadcast coverage area or the unicast coverage area needs to be urgently resolved.

SUMMARY

Embodiments of the present invention provide an information transmission method, a device, and a system, to implement that UE can receive, in the different coverage areas, broadcast information sent by a network device, and this ensures normal communication between the UE and the network device.

According to a first aspect, an embodiment of the present invention provides UE, including: a processing unit, configured to determine a type of a coverage area in which the UE is located, where the type of the coverage area is a first coverage area or a second coverage area, the first coverage area is an area that is covered by a broadcast beam sent by a network device, the broadcast beam is a beam used when the network device sends broadcast information in a broadcast manner, the second coverage area is an area that is not covered by the broadcast beam sent by the network device and that is in an area that is covered by a unicast beam sent by the network device, and the unicast beam is a beam used when the network device communicates with the UE in a unicast manner; and a receiving unit, configured to receive, by using a corresponding beam according to the type, determined by the processing unit, of the coverage area in which the UE is located, the broadcast information sent by the network device.

In a first possible implementation manner of the first aspect, the receiving unit is configured to: receive, by using the broadcast beam, the broadcast information sent by the network device when the type of the coverage area determined by the processing unit is the first coverage area; or receive, by using the unicast beam, the broadcast information sent by the network device when the type of the coverage area determined by the processing unit is the second coverage area, where a divergence angle of the unicast beam is not greater than a divergence angle of the broadcast beam.

With reference to the first aspect or the first possible implementation manner of the first aspect, in a second possible implementation manner of the first aspect, the processing unit is configured to: determine that the UE is in the second coverage area when quality of a service beam or a first broadcast beam of the UE is less than a preset threshold; or determine that the UE is in the first coverage area when quality of a service beam or a first broadcast beam of the UE is greater than or equal to a preset threshold; where the first broadcast beam is a highest-quality broadcast beam among all broadcast beams currently received by the UE.

With reference to the second possible implementation manner of the first aspect, in a third possible implementation manner of the first aspect, the UE further includes: a first sending unit, configured to: after the processing unit determines the type of the coverage area in which the UE is located, when the processing unit determines that the type of the coverage area in which the UE is located changes, send first indication information to the network device, where the first indication information is used to indicate a type of a coverage area in which the UE is currently located or indicate that the type of the coverage area in which the UE is located changes.

With reference to the second possible implementation manner of the first aspect or the third possible implementation manner of the first aspect, in a fourth possible implementation manner of the first aspect, when there are at least two service beams of the UE, that quality of a service beam of the UE is less than a preset threshold includes: quality of a highest-quality service beam among all service beams of the UE is less than the preset threshold.

With reference to the first aspect or the first possible implementation manner of the first aspect, in a fifth possible implementation manner of the first aspect, the receiving unit is further configured to: before the processing unit determines the type of the coverage area in which the UE is located, receive second indication information sent by the network device, where the second indication information is used to indicate a type of a coverage area in which the UE is currently located or indicate that the type of the coverage area in which the UE is located changes.

With reference to the fifth possible implementation manner of the first aspect, in a sixth possible implementation manner of the first aspect, the UE further includes: a first sending unit, configured to: before the receiving unit receives the second indication information sent by the network device, send quality of a service beam or a first broadcast beam to the network device, where the first broadcast beam is a highest-quality broadcast beam among all broadcast beams currently received by the UE.

With reference to the sixth possible implementation manner of the first aspect, in a seventh possible implementation manner of the first aspect, the first sending unit is configured to: send the quality of the first broadcast beam to the network device when the processing unit determines that the UE is currently in the first coverage area; or send the quality of the service beam to the network device when the processing unit determines that the UE is currently in the second coverage area.

With reference to any one of the second to fourth possible implementation manners of the first aspect, or the sixth possible implementation manner of the first aspect or the seventh possible implementation manner of the first aspect, in an eighth possible implementation manner of the first aspect, quality of the beam is reference signal received power (Reference Signal Receiving Power, RSRP for short), reference signal received quality (Reference Signal Receiving Quality, RSRQ for short), or channel state information (Channel State Indication, CSI for short) of the beam, and the beam includes the service beam or the first broadcast beam.

With reference to any one of the first to eighth possible implementation manners of the first aspect, in a ninth possible implementation manner of the first aspect, the UE further includes a second sending unit; where the receiving unit is further configured to: when the processing unit determines that the UE is in the first coverage area, receive synchronization signals and/or training pilots that are sent by the network device by using M broadcast beams, where M is an integer greater than or equal to 2; the processing unit is further configured to perform downlink synchronization, and determine quality of each broadcast beam in the M broadcast beams; the second sending unit is configured to send an identifier of a second broadcast beam to the network device, where the second broadcast beam is a highest-quality broadcast beam among the M broadcast beams; and the receiving unit is configured to receive, by using the second broadcast beam, the broadcast information sent by the network device.

With reference to the ninth possible implementation manner of the first aspect, in a tenth possible implementation manner of the first aspect, the processing unit is configured to perform downlink synchronization according to the synchronization signals and/or the training pilots, and determine the quality of each broadcast beam in the M broadcast beams.

With reference to the ninth possible implementation manner of the first aspect or the tenth possible implementation manner of the first aspect, in an eleventh possible implementation manner of the first aspect, the UE further includes: a first determining unit, configured to: before the second sending unit sends the identifier of the second broadcast beam to the network device, determine whether the identifier of the second broadcast beam is the same as an identifier of a broadcast beam used when the UE currently receives broadcast information; and the processing unit is further configured to stop sending the identifier of the second broadcast beam to the network device when the first determining unit determines that the identifier of the second broadcast beam is the same as the identifier of the broadcast beam used when the UE currently receives the broadcast information; or the second sending unit is configured to send the identifier of the second broadcast beam to the network device when the first determining unit determines that the identifier of the second broadcast beam is different from the identifier of the broadcast beam used when the UE currently receives the broadcast information.

With reference to any one of the ninth to eleventh possible implementation manners of the first aspect, in a twelfth possible implementation manner of the first aspect, the receiving unit is further configured to: after the second sending unit sends the identifier of the second broadcast beam to the network device, receive synchronization signals and/or training pilots that are sent by the network device by using H unicast beams, where H is an integer greater than or equal to 2; the processing unit is further configured to perform downlink synchronization, and determine quality of each unicast beam in the H unicast beams; the second sending unit is further configured to send an identifier of a first unicast beam to the network device, where the first unicast beam is a highest-quality unicast beam among the H unicast beams; and the receiving unit is further configured to receive, by using the first unicast beam, unicast information sent by the network device.

With reference to any one of the first to eighth possible implementation manners of the first aspect, in a thirteenth possible implementation manner of the first aspect, the UE further includes a second sending unit; where the receiving unit is further configured to: when the processing unit determines that the UE is in the second coverage area, receive synchronization signals and/or training pilots that are sent by the network device by using H unicast beams, where H is an integer greater than or equal to 2; the processing unit is further configured to perform downlink synchronization, and determine quality of each unicast beam in the H unicast beams; the second sending unit is configured to send an identifier of a first unicast beam to the network device, where the first unicast beam is a highest-quality unicast beam among the H unicast beams; the receiving unit is further configured to receive, by using the first unicast beam, unicast information sent by the network device; and the receiving unit is configured to receive, by using the first unicast beam, the broadcast information sent by the network device.

With reference to the twelfth possible implementation manner of the first aspect or the thirteenth possible implementation manner of the first aspect, in a fourteenth possible implementation manner of the first aspect, the processing unit is configured to perform downlink synchronization according to the synchronization signals and/or the training pilots that are received by the receiving unit and that are sent by the network device by using the H unicast beams, and determine the quality of each unicast beam in the H unicast beams.

With reference to any one of the twelfth to fourteenth possible implementation manners of the first aspect, in a fifteenth possible implementation manner of the first aspect, the UE further includes: a second determining unit, configured to determine whether the identifier of the first unicast beam is the same as an identifier of a unicast beam used when the UE currently communicates with the network device; and the processing unit is further configured to stop sending the identifier of the first unicast beam to the network device when the second determining unit determines that the identifier of the first unicast beam is the same as the identifier of the unicast beam used when the UE currently communicates with the network device; or the second sending unit is configured to send the identifier of the first unicast beam to the network device when the second determining unit determines that the identifier of the first unicast beam is different from the identifier of the unicast beam used when the UE currently communicates with the network device.

With reference to any one of the twelfth to fifteenth possible implementation manners of the first aspect, in a sixteenth possible implementation manner of the first aspect, the receiving unit is further configured to: before receiving the synchronization signals and/or the training pilots that are sent by the network device by using the H unicast beams, receive configuration information that is sent by the network device and is for the UE to measure the H unicast beams, where the configuration information includes an identifier and/or a sending time of each unicast beam in the H unicast beams; and the receiving unit is configured to receive the synchronization signals and/or the training pilots according to the configuration information at the sending time of each unicast beam in the H unicast beams by using each unicast beam.

With reference to any one of the twelfth to sixteenth possible implementation manners of the first aspect, in a seventeenth possible implementation manner of the first aspect, the H unicast beams include the service beam of the UE and N adjacent unicast beams, and N is an integer greater than or equal to 1.

With reference to any one of the twelfth to seventeenth possible implementation manners of the first aspect, in an eighteenth possible implementation manner of the first aspect, the second sending unit is configured to send identifiers of Y unicast beams to the network device in descending order or ascending order of quality; or the second sending unit is configured to send quality ranking information of Y unicast beams to the network device; where Y is an integer greater than or equal to 1 and less than or equal to H.

With reference to any one of the twelfth to eighteenth possible implementation manners of the first aspect, in a nineteenth possible implementation manner of the first aspect, the receiving unit is further configured to: after the second sending unit sends the identifier of the first unicast beam to the network device, receive first signaling sent by the network device, where the first signaling includes an identifier of a second unicast beam, and the first signaling instructs the UE to use the second unicast beam as the service beam; and the processing unit is further configured to switch the service beam of the UE to the second unicast beam according to the first signaling.

With reference to any one of the first to nineteenth possible implementation manners of the first aspect, in a twentieth possible implementation manner of the first aspect, the processing unit is further configured to: after determining that the UE is in the second coverage area, stop initiating a random access procedure to the network device, or stop an ongoing random access procedure.

With reference to any one of the first to twentieth possible implementation manners of the first aspect, in a twenty-first possible implementation manner of the first aspect, the UE further includes a third sending unit; where the receiving unit is further configured to: after the processing unit determines that the UE is in the first coverage area, receive physical random access channel (Physical Random Access Channel, PRACH for short) configuration information that is sent by the network device by using one broadcast beam; the third sending unit is configured to send a random access preamble to the network device by using an uplink beam on a time-frequency resource indicated by the PRACH configuration information, where the uplink beam has an association relationship with the broadcast beam or a sending direction of the uplink beam is opposite to a sending direction of the broadcast beam; the receiving unit is further configured to receive a random access response (Random Access Response, RAR for short) message sent by the network device, where the RAR message includes an identifier of the random access preamble and uplink authorization information, and the uplink authorization information is used to authorize, to the UE, an uplink time-frequency resource and an uplink beam that are used for communication with the network device; and the third sending unit is further configured to send a random access message 3 to the network device by using the uplink beam authorized by the uplink authorization information and on the uplink time-frequency resource authorized by the uplink authorization information, where the random access message 3 includes identifier information of the UE.

With reference to the twenty-first possible implementation manner of the first aspect, in a twenty-second possible implementation manner of the first aspect, that the uplink authorization information is used to authorize, to the UE, an uplink beam that is used for communication with the network device includes: the uplink authorization information is used to authorize the UE to use all uplink beams to communicate with the network device.

With reference to either of the first aspect or any one of the first to twenty-second possible implementation manners of the first aspect, in a twenty-third possible implementation manner of the first aspect, the receiving unit is further configured to: when the UE and the network device need cross-carrier scheduling, receive downlink control information (Downlink Control Information, DCI for short) that is sent by the network device in a first transmission time interval (Transmission Time Interval, TTI for short) of a scheduling cell, where the DCI indicates radio resource allocation information in K consecutive second TTIs of a scheduled cell, and K is an integer greater than or equal to 2.

With reference to the twenty-third possible implementation manner of the first aspect, in a twenty-fourth possible implementation manner of the first aspect, the first TTI is K times as large as the second TTI.

With reference to the twenty-third possible implementation manner of the first aspect or the twenty-fourth possible implementation manner of the first aspect, in a twenty-fifth possible implementation manner of the first aspect, the radio resource allocation information is indicated according to unified numbers of physical resource blocks (Physical Resource Block, PRB) in the K consecutive second TTIs.

With reference to the twenty-fifth possible implementation manner of the first aspect, in a twenty-sixth possible implementation manner of the first aspect, order of the unified numbers of the PRBs in terms of a time domain is ascending order of time; and order of the unified numbers of the PRBs in terms of a frequency domain is descending order or ascending order of a frequency.

According to a second aspect, an embodiment of the present invention provides a network device, including: a processing unit, configured to determine a type of a coverage area in which UE is located, where the type of the coverage area is a first coverage area or a second coverage area, the first coverage area is an area that is covered by a broadcast beam sent by the network device, the broadcast beam is a beam used when the network device sends broadcast information in a broadcast manner, the second coverage area is an area that is not covered by the broadcast beam sent by the network device and that is in an area that is covered by a unicast beam sent by the network device, and the unicast beam is a beam used when the network device communicates with the UE in a unicast manner; and a sending unit, configured to send the broadcast information to the UE by using a corresponding beam according to the type, determined by the processing unit, of the coverage area in which the UE is located.

In a first possible implementation manner of the second aspect, the sending unit is configured to: send the broadcast information to the UE by using the broadcast beam when the processing unit determines that the type of the coverage area is the first coverage area; or send the broadcast information to the UE by using the unicast beam when the processing unit determines that the type of the coverage area is the second coverage area, where a divergence angle of the unicast beam is not greater than a divergence angle of the broadcast beam.

With reference to the second aspect or the first possible implementation manner of the second aspect, in a second possible implementation manner of the second aspect, the network device further includes: a first receiving unit, configured to: before the processing unit determines the type of the coverage area in which UE is located, receive first indication information sent by the UE, where the first indication information is used to indicate a type of a coverage area in which the UE is currently located or indicate that the type of the coverage area in which the UE is located changes.

With reference to the second aspect or the first possible implementation manner of the second aspect, in a third possible implementation manner of the second aspect, the processing unit is configured to: determine that the UE is in the second coverage area when quality of a service beam or a first broadcast beam of the UE is less than a preset threshold; or determine that the UE is in the first coverage area when quality of a service beam or a first broadcast beam of the UE is greater than or equal to a preset threshold; where the first broadcast beam is a highest-quality broadcast beam among all broadcast beams currently received by the UE.

With reference to the third possible implementation manner of the second aspect, in a fourth possible implementation manner of the second aspect, the sending unit is further configured to: after the processing unit determines the type of the coverage area in which UE is located, when the processing unit determines that the type of the coverage area in which the UE is located changes, send second indication information to the UE, where the second indication information is used to indicate a type of a coverage area in which the UE is currently located or indicate that the type of the coverage area in which the UE is located changes.

With reference to the third possible implementation manner of the second aspect or the fourth possible implementation manner of the second aspect, in a fifth possible implementation manner of the second aspect, when there are at least two service beams of the UE, that quality of a service beam of the UE is less than a preset threshold includes: quality of a highest-quality service beam among all service beams of the UE is less than the preset threshold.

With reference to any one of the third to fifth possible implementation manners of the second aspect, in a sixth possible implementation manner of the second aspect, the network device further includes: a first receiving unit, configured to: before the processing unit determines the type of the coverage area in which UE is located, receive the quality of the service beam or the first broadcast beam sent by the UE.

With reference to the sixth possible implementation manner of the second aspect, in a seventh possible implementation manner of the second aspect, the first receiving unit is configured to: receive the quality of the first broadcast beam sent by the UE when the processing unit determines that the UE is currently in the first coverage area; or receive the quality of the service beam sent by the UE when the processing unit determines that the UE is currently in the second coverage area.

With reference to any one of the third to seventh possible implementation manners of the second aspect, in an eighth possible implementation manner of the second aspect, quality of the beam is RSRP, RSRQ, or CSI of the beam, and the beam includes the service beam or the first broadcast beam.

With reference to any one of the first to eighth possible implementation manners of the second aspect, in a ninth possible implementation manner of the second aspect, the network device further includes a second receiving unit; where the sending unit is further configured to: when the processing unit determines that the UE is in the first coverage area, send synchronization signals and/or training pilots to the UE by using M broadcast beams, where M is an integer greater than or equal to 2; the second receiving unit is configured to receive an identifier of a second broadcast beam sent by the UE, where the second broadcast beam is a highest-quality broadcast beam among the M broadcast beams; and the sending unit is configured to send the broadcast information to the UE by using the second broadcast beam.

With reference to the ninth possible implementation manner of the second aspect, in a tenth possible implementation manner of the second aspect, the identifier of the second broadcast beam is different from an identifier of a broadcast beam used when the network device currently sends broadcast information to the UE.

With reference to the ninth possible implementation manner of the second aspect or the tenth possible implementation manner of the second aspect, in an eleventh possible implementation manner of the second aspect, the sending unit is further configured to: after the second receiving unit receives the identifier of the second broadcast beam sent by the UE, send synchronization signals and/or training pilots to the UE by using H unicast beams, where H is an integer greater than or equal to 2; the second receiving unit is further configured to receive an identifier of a first unicast beam sent by the UE, where the first unicast beam is a highest-quality unicast beam among the H unicast beams; and the sending unit is further configured to send unicast information to the UE by using the first unicast beam.

With reference to any one of the first to eighth possible implementation manners of the second aspect, in a twelfth possible implementation manner of the second aspect, the network device further includes a second receiving unit; where the sending unit is configured to: when the processing unit determines that the UE is in the second coverage area, send synchronization signals and/or training pilots to the UE by using H unicast beams, where H is an integer greater than or equal to 2; the second receiving unit is configured to receive an identifier of a first unicast beam sent by the UE, where the first unicast beam is a highest-quality unicast beam among the H unicast beams; the sending unit is further configured to send unicast information to the UE by using the first unicast beam; and the sending unit is configured to send the broadcast information to the UE by using the first unicast beam.

With reference to the eleventh possible implementation manner of the second aspect or the twelfth possible implementation manner of the second aspect, in a thirteenth possible implementation manner of the second, the identifier of the first unicast beam is different from an identifier of a unicast beam used when the network device currently communicates with the UE.

With reference to any one of the eleventh to thirteenth possible implementation manners of the second aspect, in a fourteenth possible implementation manner of the second aspect, the sending unit is further configured to: before sending the synchronization signals and/or the training pilots to the UE by using the H unicast beams, send, to the UE, configuration information that is for the UE to measure the H unicast beams, where the configuration information includes an identifier and/or a sending time of each unicast beam in the H unicast beams.

With reference to any one of the eleventh to fourteenth possible implementation manners of the second aspect, in a fifteenth possible implementation manner of the second aspect, the H unicast beams include the service beam of the UE and N adjacent unicast beams, and N is an integer greater than or equal to 1.

With reference to any one of the eleventh to fifteenth possible implementation manners of the second aspect, in a sixteenth possible implementation manner of the second aspect, that the second receiving unit is configured to: receive identifiers of Y unicast beams that are sent by the UE in descending order or ascending order of quality; or the second receiving unit is configured to receive quality ranking information of Y unicast beams that is sent by the UE; where Y is an integer greater than or equal to 1 and less than or equal to H.

With reference to any one of the eleventh to sixteenth possible implementation manners of the second aspect, in a seventeenth possible implementation manner of the second aspect, the sending unit is further configured to: after the second receiving unit receives the identifier of the first unicast beam sent by the UE, send first signaling to the UE, where the first signaling includes an identifier of a second unicast beam, and the first signaling instructs the UE to use the second unicast beam as the service beam; and the processing unit is further configured to switch the service beam of the UE to the second unicast beam.

With reference to any one of the first to seventeenth possible implementation manners of the second aspect, in an eighteenth possible implementation manner of the second aspect, the network device further includes a third receiving unit; where the sending unit is further configured to: after the processing unit determines that the UE is in the first coverage area, send PRACH configuration information by using one broadcast beam; the third receiving unit is configured to receive a random access preamble that is sent by the UE by using an uplink beam on a time-frequency resource indicated by the PRACH configuration information, where the uplink beam has an association relationship with the broadcast beam or a sending direction of the uplink beam is opposite to a sending direction of the broadcast beam; the sending unit is further configured to send a RAR message to the UE, where the RAR message includes an identifier of the random access preamble and uplink authorization information, and the uplink authorization information is used to authorize, to the UE, an uplink time-frequency resource and an uplink beam that are used for communication with the network device; and the third receiving unit is further configured to receive a random access message 3 that is sent by the UE by using the uplink beam authorized by the uplink authorization information and on the uplink time-frequency resource authorized by the uplink authorization information, where the random access message 3 includes identifier information of the UE.

With reference to the eighteenth possible implementation manner of the second aspect, in a nineteenth possible implementation manner of the second aspect, that the uplink authorization information is used to authorize, to the UE, an uplink beam that is used for communication with the network device includes: the uplink authorization information is used to authorize the UE to use all uplink beams to communicate with the network device.

With reference to the second aspect or any one of the first to nineteenth possible implementation manners of the second aspect, in a twentieth possible implementation manner of the second aspect, the sending unit is further configured to: when the UE and the network device need cross-carrier scheduling, send DCI to the UE in a first TTI of a scheduling cell, where the DCI indicates radio resource allocation information in K consecutive second TTIs of a scheduled cell, and K is an integer greater than or equal to 2.

With reference to the twentieth possible implementation manner of the second aspect, in a twenty-first possible implementation manner of the second aspect, the first TTI is K times as large as the second TTI.

With reference to the twentieth possible implementation manner of the second aspect or the twenty-first possible implementation manner of the second aspect, in a twenty-second possible implementation manner of the second aspect, the radio resource allocation information is indicated according to unified numbers of PRBs in the K consecutive second TTIs.

With reference to the twenty-second possible implementation manner of the second aspect, in a twenty-third possible implementation manner of the second aspect, order of the unified numbers of the PRBs in terms of a time domain is ascending order of time; and order of the unified numbers of the PRBs in terms of a frequency domain is descending order or ascending order of a frequency.

According to a third aspect, an embodiment of the present invention further provides UE, including: a processor, configured to determine a type of a coverage area in which the UE is located, where the type of the coverage area is a first coverage area or a second coverage area, the first coverage area is an area that is covered by a broadcast beam sent by a network device, the broadcast beam is a beam used when the network device sends broadcast information in a broadcast manner, the second coverage area is an area that is not covered by the broadcast beam sent by the network device and that is in an area that is covered by a unicast beam sent by the network device, and the unicast beam is a beam used when the network device communicates with the UE in a unicast manner; and a transceiver, configured to receive, by using a corresponding beam according to the type, determined by the processor, of the coverage area in which the UE is located, the broadcast information sent by the network device.

In a first possible implementation manner of the third aspect, the transceiver is configured to: receive, by using the broadcast beam, the broadcast information sent by the network device when the type of the coverage area determined by the processor is the first coverage area; or receive, by using the unicast beam, the broadcast information sent by the network device when the type of the coverage area determined by the processor is the second coverage area, where a divergence angle of the unicast beam is not greater than a divergence angle of the broadcast beam.

With reference to the third aspect or the first possible implementation manner of the third aspect, in a second possible implementation manner of the third aspect, the processor is configured to: determine that the UE is in the second coverage area when quality of a service beam or a first broadcast beam of the UE is less than a preset threshold; or determine that the UE is in the first coverage area when quality of a service beam or a first broadcast beam of the UE is greater than or equal to a preset threshold; where the first broadcast beam is a highest-quality broadcast beam among all broadcast beams currently received by the UE.

With reference to the second possible implementation manner of the third aspect, in a third possible implementation manner of the third aspect, the transceiver is further configured to: after the processor determines the type of the coverage area in which the UE is located, when the processor determines that the type of the coverage area in which the UE is located changes, send first indication information to the network device, where the first indication information is used to indicate a type of a coverage area in which the UE is currently located or indicate that the type of the coverage area in which the UE is located changes.

With reference to the second possible implementation manner of the third aspect or the third possible implementation manner of the third aspect, in a fourth possible implementation manner of the third aspect, when there are at least two service beams of the UE, that quality of a service beam of the UE is less than a preset threshold includes: quality of a highest-quality service beam among all service beams of the UE is less than the preset threshold.

With reference to the third aspect or the first possible implementation manner of the third aspect, in a fifth possible implementation manner of the third aspect, the transceiver is further configured to: before the processor determines the type of the coverage area in which the UE is located, receive second indication information sent by the network device, where the second indication information is used to indicate a type of a coverage area in which the UE is currently located or indicate that the type of the coverage area in which the UE is located changes.

With reference to the fifth possible implementation manner of the third aspect, in a sixth possible implementation manner of the third aspect, the transceiver is further configured to: before receiving the second indication information sent by the network device, send quality of a service beam or a first broadcast beam to the network device, where the first broadcast beam is a highest-quality broadcast beam among all broadcast beams currently received by the UE.

With reference to the sixth possible implementation manner of the third aspect, in a seventh possible implementation manner of the third aspect, the transceiver is configured to send the quality of the first broadcast beam to the network device when the processor determines that the UE is currently in the first coverage area; or send the quality of the service beam to the network device when the processor determines that the UE is currently in the second coverage area.

With reference to any one of the second to fourth possible implementation manners of the third aspect, or the sixth possible implementation manner of the third aspect or the seventh possible implementation manner of the third aspect, in an eighth possible implementation manner of the third aspect, quality of the beam is RSRP, RSRQ, or CSI of the beam, and the beam includes the service beam or the first broadcast beam.

With reference to any one of the first to eighth possible implementation manners of the third aspect, in a ninth possible implementation manner of the third aspect, the transceiver is further configured to: when the processor determines that the UE is in the first coverage area, receive synchronization signals and/or training pilots that are sent by the network device by using M broadcast beams, where M is an integer greater than or equal to 2; the processor is further configured to perform downlink synchronization, and determine quality of each broadcast beam in the M broadcast beams; the transceiver is further configured to send an identifier of a second broadcast beam to the network device, where the second broadcast beam is a highest-quality broadcast beam among the M broadcast beams; and the transceiver is configured to receive, by using the second broadcast beam, the broadcast information sent by the network device.

With reference to the ninth possible implementation manner of the third aspect, in a tenth possible implementation manner of the third aspect, the processor is configured to perform downlink synchronization according to the synchronization signals and/or the training pilots, and determine the quality of each broadcast beam in the M broadcast beams.

With reference to the ninth possible implementation manner of the third aspect or the tenth possible implementation manner of the third aspect, in an eleventh possible implementation manner of the third aspect, the processor is further configured to: before the transceiver sends the identifier of the second broadcast beam to the network device, determine whether the identifier of the second broadcast beam is the same as an identifier of a broadcast beam used when the UE currently receives broadcast information; and stop sending the identifier of the second broadcast beam to the network device when determining that the identifier of the second broadcast beam is the same as the identifier of the broadcast beam used when the UE currently receives the broadcast information; or the transceiver is configured to send the identifier of the second broadcast beam to the network device when the processor determines that the identifier of the second broadcast beam is different from the identifier of the broadcast beam used when the UE currently receives the broadcast information.

With reference to any one of the ninth to eleventh possible implementation manners of the third aspect, in a twelfth possible implementation manner of the third aspect, the transceiver is further configured to: after sending the identifier of the second broadcast beam to the network device, receive synchronization signals and/or training pilots that are sent by the network device by using H unicast beams, where H is an integer greater than or equal to 2; the processor is further configured to perform downlink synchronization, and determine quality of each unicast beam in the H unicast beams; the transceiver is further configured to: send an identifier of a first unicast beam to the network device, where the first unicast beam is a highest-quality unicast beam among the H unicast beams; and receive, by using the first unicast beam, unicast information sent by the network device.

With reference to any one of the first to eighth possible implementation manners of the third aspect, in a thirteenth possible implementation manner of the third aspect, the transceiver is further configured to: when the processor determines that the UE is in the second coverage area, receive synchronization signals and/or training pilots that are sent by the network device by using H unicast beams, where H is an integer greater than or equal to 2; the processor is further configured to perform downlink synchronization, and determine quality of each unicast beam in the H unicast beams; the transceiver is further configured to: send an identifier of a first unicast beam to the network device, where the first unicast beam is a highest-quality unicast beam among the H unicast beams; and receive, by using the first unicast beam, unicast information sent by the network device; and the transceiver is configured to receive, by using the first unicast beam, the broadcast information sent by the network device.

With reference to the twelfth possible implementation manner of the third aspect or the thirteenth possible implementation manner of the third aspect, in a fourteenth possible implementation manner of the third aspect, the processor is configured to perform downlink synchronization according to the synchronization signals and/or the training pilots that are received by the transceiver and that are sent by the network device by using the H unicast beams, and determine the quality of each unicast beam in the H unicast beams.

With reference to any one of the twelfth to fourteenth possible implementation manners of the third aspect, in a fifteenth possible implementation manner of the third aspect, the processor is further configured to determine whether the identifier of the first unicast beam is the same as an identifier of a unicast beam used when the UE currently communicates with the network device; and the processor is further configured to stop sending the identifier of the first unicast beam to the network device when determining that the identifier of the first unicast beam is the same as the identifier of the unicast beam used when the UE currently communicates with the network device; or the transceiver is configured to send the identifier of the first unicast beam to the network device when the processor determines that the identifier of the first unicast beam is different from the identifier of the unicast beam used when the UE currently communicates with the network device.

With reference to any one of the twelfth to fifteenth possible implementation manners of the third aspect, in a sixteenth possible implementation manner of the third aspect, the transceiver is further configured to: before receiving the synchronization signals and/or the training pilots that are sent by the network device by using the H unicast beams, receive configuration information that is sent by the network device and is for the UE to measure the H unicast beams, where the configuration information includes an identifier and/or a sending time of each unicast beam in the H unicast beams; and the transceiver is configured to receive the synchronization signals and/or the training pilots according to the configuration information at the sending time of each unicast beam in the H unicast beams by using each unicast beam.

With reference to any one of the twelfth to sixteenth possible implementation manners of the third aspect, in a seventeenth possible implementation manner of the third aspect, the H unicast beams include the service beam of the UE and N adjacent unicast beams, and N is an integer greater than or equal to 1.

With reference to any one of the twelfth to seventeenth possible implementation manners of the third aspect, in an eighteenth possible implementation manner of the third aspect, the transceiver is configured to send identifiers of Y unicast beams to the network device in descending order or ascending order of quality; or transceiver is configured to send quality ranking information of Y unicast beams to the network device; where Y is an integer greater than or equal to 1 and less than or equal to H.

With reference to any one of the twelfth to eighteenth possible implementation manners of the third aspect, in a nineteenth possible implementation manner of the third aspect, the transceiver is further configured to: after sending the identifier of the first unicast beam to the network device, receive first signaling sent by the network device, where the first signaling includes an identifier of a second unicast beam, and the first signaling instructs the UE to use the second unicast beam as the service beam; and the processor is further configured to switch the service beam of the UE to the second unicast beam according to the first signaling.

With reference to any one of the first to nineteenth possible implementation manners of the third aspect, in a twentieth possible implementation manner of the third aspect, the processor is further configured to: after determining that the UE is in the second coverage area, stop initiating a random access procedure to the network device, or stop an ongoing random access procedure.

With reference to any one of the first to twentieth possible implementation manners of the third aspect, in a twenty-first possible implementation manner of the third aspect, the transceiver is further configured to: after the processor determines that the UE is in the first coverage area, receive PRACH configuration information that is sent by the network device by using one broadcast beam; the transceiver is further configured to send a random access preamble to the network device by using an uplink beam on a time-frequency resource indicated by the PRACH configuration information, where the uplink beam has an association relationship with the broadcast beam or a sending direction of the uplink beam is opposite to a sending direction of the broadcast beam; the transceiver is further configured to: receive a RAR message sent by the network device, where the RAR message includes an identifier of the random access preamble and uplink authorization information, and the uplink authorization information is used to authorize, to the UE, an uplink time-frequency resource and an uplink beam that are used for communication with the network device; and send a random access message 3 to the network device by using the uplink beam authorized by the uplink authorization information and on the uplink time-frequency resource authorized by the uplink authorization information, where the random access message 3 includes identifier information of the UE.

With reference to the twenty-first possible implementation manner of the third aspect, in a twenty-second possible implementation manner of the third aspect, the uplink authorization information is used to authorize, to the UE, an uplink beam that is used for communication with the network device includes: the uplink authorization information is used to authorize the UE to use all uplink beams to communicate with the network device.

With reference to the third aspect or any one of the first to twenty-second possible implementation manners of the third aspect, in a twenty-third possible implementation manner of the third aspect, the transceiver is further configured to: when the UE and the network device need cross-carrier scheduling, receive DCI that is sent by the network device in a first TTI of a scheduling cell, where the DCI indicates radio resource allocation information in K consecutive second TTIs of a scheduled cell, and K is an integer greater than or equal to 2.

With reference to the twenty-third possible implementation manner of the third aspect, in a twenty-fourth possible implementation manner of the third aspect, the first TTI is K times as large as the second TTI.

With reference to the twenty-third possible implementation manner of the third aspect or the twenty-fourth possible implementation manner of the third aspect, in a twenty-fifth possible implementation manner of the third aspect, the radio resource allocation information is indicated according to unified numbers of PRBs in the K consecutive second TTIs.

With reference to the twenty-fifth possible implementation manner of the third aspect, in a twenty-sixth possible implementation manner of the third aspect, order of the unified numbers of the PRBs in terms of a time domain is ascending order of time; and order of the unified numbers of the PRBs in terms of a frequency domain is descending order or ascending order of a frequency.

According to a fourth aspect, an embodiment of the present invention further provides a network device, including: a processor, configured to determine a type of a coverage area in which UE is located, where the type of the coverage area is a first coverage area or a second coverage area, the first coverage area is an area that is covered by a broadcast beam sent by the network device, the broadcast beam is a beam used when the network device sends broadcast information in a broadcast manner, the second coverage area is an area that is not covered by the broadcast beam sent by the network device and that is in an area that is covered by a unicast beam sent by the network device, and the unicast beam is a beam used when the network device communicates with the UE in a unicast manner; and a transceiver, configured to send the broadcast information to the UE by using a corresponding beam according to the type, determined by the processor, of the coverage area in which the UE is located.

In a first possible implementation manner of the fourth aspect, the transceiver is configured to: send the broadcast information to the UE by using the broadcast beam when the processor determines that the type of the coverage area is the first coverage area; or send the broadcast information to the UE by using the unicast beam when the processor determines that the type of the coverage area is the second coverage area, where a divergence angle of the unicast beam is not greater than a divergence angle of the broadcast beam.

With reference to the fourth aspect or the first possible implementation manner of the fourth aspect, in a second possible implementation manner of the fourth aspect, the transceiver is further configured to: before the processor determines the type of the coverage area in which the UE is located, receive first indication information sent by the UE, where the first indication information is used to indicate a type of a coverage area in which the UE is currently located or indicate that the type of the coverage area in which the UE is located changes.

With reference to the fourth aspect or the first possible implementation manner of the fourth aspect, in a third possible implementation manner of the fourth aspect, the processor is configured to: determine that the UE is in the second coverage area when quality of a service beam or a first broadcast beam of the UE is less than a preset threshold; or determine that the UE is in the first coverage area when quality of a service beam or a first broadcast beam of the UE is greater than or equal to a preset threshold; where the first broadcast beam is a highest-quality broadcast beam among all broadcast beams currently received by the UE.

With reference to the third possible implementation manner of the fourth aspect, in a fourth possible implementation manner of the fourth aspect, the transceiver is further configured to: after the processor determines the type of the coverage area in which UE is located, when the processor determines that the type of the coverage area in which the UE is located changes, send second indication information to the UE, where the second indication information is used to indicate a type of a coverage area in which the UE is currently located or indicate that the type of the coverage area in which the UE is located changes.

With reference to the third possible implementation manner of the fourth aspect or the fourth possible implementation manner of the fourth aspect, in a fifth possible implementation manner of the fourth aspect, when there are at least two service beams of the UE, that quality of a service beam of the UE is less than a preset threshold includes: quality of a highest-quality service beam among all service beams of the UE is less than the preset threshold.

With reference to any one of the third to fifth possible implementation manners of the fourth aspect, in a sixth possible implementation manner of the fourth aspect, the transceiver is further configured to: before the processor determines the type of the coverage area in which UE is located, receive the quality of the service beam or the first broadcast beam sent by the UE.

With reference to the sixth possible implementation manner of the fourth aspect, in a seventh possible implementation manner of the fourth aspect, the transceiver is configured to receive the quality of the first broadcast beam sent by the UE when the processor determines that the UE is currently in the first coverage area; or receive the quality of the service beam sent by the UE when the processor determines that the UE is currently in the second coverage area.

With reference to any one of the third to seventh possible implementation manners of the fourth aspect, in an eighth possible implementation manner of the fourth aspect, quality of the beam is RSRP, RSRQ, or CSI of the beam, and the beam includes the service beam or the first broadcast beam.

With reference to any one of the first to eighth possible implementation manners of the fourth aspect, in a ninth possible implementation manner of the fourth aspect, the transceiver is further configured to: when the processor determines that the UE is in the first coverage area, send synchronization signals and/or training pilots to the UE by using M broadcast beams, where M is an integer greater than or equal to 2; and receive an identifier of a second broadcast beam sent by the UE, where the second broadcast beam is a highest-quality broadcast beam among the M broadcast beams; and the transceiver is configured to send the broadcast information to the UE by using the second broadcast beam.

With reference to the ninth possible implementation manner of the fourth aspect, in a tenth possible implementation manner of the fourth aspect, the identifier of the second broadcast beam is different from an identifier of a broadcast beam used when the network device currently sends broadcast information to the UE.

With reference to the ninth possible implementation manner of the fourth aspect or the tenth possible implementation manner of the fourth aspect, in an eleventh possible implementation manner of the fourth aspect, the transceiver is further configured to: after receiving the identifier of the second broadcast beam sent by the UE, send synchronization signals and/or training pilots to the UE by using H unicast beams, where H is an integer greater than or equal to 2; receive an identifier of a first unicast beam sent by the UE, where the first unicast beam is a highest-quality unicast beam among the H unicast beams; and send unicast information to the UE by using the first unicast beam.

With reference to any one of the first to eighth possible implementation manners of the fourth aspect, in a twelfth possible implementation manner of the fourth aspect, the transceiver is further configured to: when the processor determines that the UE is in the second coverage area, send synchronization signals and/or training pilots to the UE by using H unicast beams, where H is an integer greater than or equal to 2; receive an identifier of a first unicast beam sent by the UE, where the first unicast beam is a highest-quality unicast beam among the H unicast beams; and send unicast information to the UE by using the first unicast beam; and the transceiver is configured to send the broadcast information to the UE by using the first unicast beam.

With reference to the eleventh possible implementation manner of the fourth aspect or the twelfth possible implementation manner of the fourth aspect, in a thirteenth possible implementation manner of the fourth aspect, the identifier of the first unicast beam is different from an identifier of a unicast beam used when the network device currently communicates with the UE.

With reference to any one of the eleventh to thirteenth possible implementation manners of the fourth aspect, in a fourteenth possible implementation manner of the fourth aspect, the transceiver is further configured to: before sending the synchronization signals and/or the training pilots to the UE by using the H unicast beams, send, to the UE, configuration information that is for the UE to measure the H unicast beams, where the configuration information includes an identifier and/or a sending time of each unicast beam in the H unicast beams.

With reference to any one of the eleventh to fourteenth possible implementation manners of the fourth aspect, in a fifteenth possible implementation manner of the fourth aspect, the H unicast beams include the service beam of the UE and N adjacent unicast beams, and N is an integer greater than or equal to 1.

With reference to any one of the eleventh to fifteenth possible implementation manners of the fourth aspect, in a sixteenth possible implementation manner of the fourth aspect, the transceiver is configured to: receive identifiers of Y unicast beams that are sent by the UE in descending order or ascending order of quality; or the transceiver is configured to receive quality ranking information of Y unicast beams that is sent by the UE; where Y is an integer greater than or equal to 1 and less than or equal to H.

With reference to any one of the eleventh to sixteenth possible implementation manners of the fourth aspect, in a seventeenth possible implementation manner of the fourth aspect, the transceiver is further configured to: after the transceiver receives the identifier of the first unicast beam sent by the UE, send first signaling to the UE, where the first signaling includes an identifier of a second unicast beam, and the first signaling instructs the UE to use the second unicast beam as the service beam; and the processor is further configured to switch the service beam of the UE to the second unicast beam.

With reference to any one of the first to seventeenth possible implementation manners of the fourth aspect, in an eighteenth possible implementation manner of the fourth aspect, the transceiver is further configured to: after the processor determines that the UE is in the first coverage area, send PRACH configuration information by using one broadcast beam; receive a random access preamble that is sent by the UE by using an uplink beam on a time-frequency resource indicated by the PRACH configuration information, where the uplink beam has an association relationship with the broadcast beam or a sending direction of the uplink beam is opposite to a sending direction of the broadcast beam; send a RAR message to the UE, where the RAR message includes an identifier of the random access preamble and uplink authorization information, and the uplink authorization information is used to authorize, to the UE, an uplink time-frequency resource and an uplink beam that are used for communication with the network device; and receive a random access message 3 that is sent by the UE by using the uplink beam authorized by the uplink authorization information and on the uplink time-frequency resource authorized by the uplink authorization information, where the random access message 3 includes identifier information of the UE.

With reference to the eighteenth possible implementation manner of the fourth aspect, in a nineteenth possible implementation manner of the fourth aspect, that the uplink authorization information is used to authorize, to the UE, an uplink beam that is used for communication with the network device includes: the uplink authorization information is used to authorize the UE to use all uplink beams to communicate with the network device.

With reference to the fourth aspect or any one of the first to nineteenth possible implementation manners of the fourth aspect, in a twentieth possible implementation manner of the fourth aspect, the transceiver is further configured to: when the UE and the network device need cross-carrier scheduling, send DCI to the UE in a first TTI of a scheduling cell, where the DCI indicates radio resource allocation information in K consecutive second TTIs of a scheduled cell, and K is an integer greater than or equal to 2.

With reference to the twentieth possible implementation manner of the fourth aspect, in a twenty-first possible implementation manner of the fourth aspect, the first TTI is K times as large as the second TTI.

With reference to the twentieth possible implementation manner of the fourth aspect or the twenty-first possible implementation manner of the fourth aspect, in a twenty-second possible implementation manner of the fourth aspect, the radio resource allocation information is indicated according to unified numbers of PRBs in the K consecutive second TTIs.

With reference to the twenty-second possible implementation manner of the fourth aspect, in a twenty-third possible implementation manner of the fourth aspect, order of the unified numbers of the PRBs in terms of a time domain is ascending order of time; and order of the unified numbers of the PRBs in terms of a frequency domain is descending order or ascending order of a frequency.

According to a fifth aspect, an embodiment of the present invention provides an information transmission method, including: determining, by UE, a type of a coverage area in which the UE is located, where the type of the coverage area is a first coverage area or a second coverage area, the first coverage area is an area that is covered by a broadcast beam sent by a network device, the broadcast beam is a beam used when the network device sends broadcast information in a broadcast manner, the second coverage area is an area that is not covered by the broadcast beam sent by the network device and that is in an area that is covered by a unicast beam sent by the network device, and the unicast beam is a beam used when the network device communicates with the UE in a unicast manner; and receiving, by the UE by using a corresponding beam according to the type of the coverage area in which the UE is located, the broadcast information sent by the network device.

In a first possible implementation manner of the fifth aspect, the receiving, by the UE by using a corresponding beam according to the type of the coverage area in which the UE is located, the broadcast information sent by the network device includes: receiving, by the UE by using the broadcast beam, the broadcast information sent by the network device when the type of the coverage area is the first coverage area; or receiving, by the UE by using the unicast beam, the broadcast information sent by the network device when the type of the coverage area is the second coverage area, where a divergence angle of the unicast beam is not greater than a divergence angle of the broadcast beam.

With reference to the fifth aspect or the first possible implementation manner of the fifth aspect, in a second possible implementation manner of the fifth aspect, the determining, by UE, a type of a coverage area in which the UE is located includes: determining, by the UE, that the UE is in the second coverage area when quality of a service beam or a first broadcast beam of the UE is less than a preset threshold; or determining, by the UE, that the UE is in the first coverage area when quality of a service beam or a first broadcast beam of the UE is greater than or equal to a preset threshold; where the first broadcast beam is a highest-quality broadcast beam among all broadcast beams currently received by the UE.

With reference to the second possible implementation manner of the fifth aspect, in a third possible implementation manner of the fifth aspect, after the determining, by UE, a type of a coverage area in which the UE is located, the method further includes: when the UE determines that the type of the coverage area in which the UE is located changes, sending, by the UE, first indication information to the network device, where the first indication information is used to indicate a type of a coverage area in which the UE is currently located or indicate that the type of the coverage area in which the UE is located changes.

With reference to the second possible implementation manner of the fifth aspect or the third possible implementation manner of the fifth aspect, in a fourth possible implementation manner of the fifth aspect, when there are at least two service beams of the UE, that quality of a service beam of the UE is less than a preset threshold includes: quality of a highest-quality service beam among all service beams of the UE is less than the preset threshold.

With reference to the fifth aspect or the first possible implementation manner of the fifth aspect, in a fifth possible implementation manner of the fifth aspect, before the determining, by UE, a type of a coverage area in which the UE is located, the method further includes: receiving, by the UE, second indication information sent by the network device, where the second indication information is used to indicate a type of a coverage area in which the UE is currently located or indicate that the type of the coverage area in which the UE is located changes.

With reference to the fifth possible implementation manner of the fifth aspect, in a sixth possible implementation manner of the fifth aspect, before the receiving, by the UE, second indication information sent by the network device, the method further includes: sending, by the UE, quality of a service beam or a first broadcast beam to the network device, where the first broadcast beam is a highest-quality broadcast beam among all broadcast beams currently received by the UE.

With reference to the sixth possible implementation manner of the fifth aspect, in a seventh possible implementation manner of the fifth aspect, the sending, by the UE, quality of the service beam or a first broadcast beam to the network device includes: sending, by the UE, the quality of the first broadcast beam to the network device when the UE determines that the UE is currently in the first coverage area; or sending, by the UE, the quality of the service beam to the network device when the UE determines that the UE is currently in the second coverage area.

With reference to any one of the second to fourth possible implementation manners of the fifth aspect, or the sixth possible implementation manner of the fifth aspect or the seventh possible implementation manner of the fifth aspect, in an eighth possible implementation manner of the fifth aspect, quality of the beam is RSRP, RSRQ, or CSI of the beam, and the beam includes the service beam or the first broadcast beam.

With reference to any one of the first to eighth possible implementation manners of the fifth aspect, in a ninth possible implementation manner of the fifth aspect, when the UE is in the first coverage area, the method further includes: receiving, by the UE, synchronization signals and/or training pilots that are sent by the network device by using M broadcast beams, where M is an integer greater than or equal to 2; performing, by the UE, downlink synchronization, and determining quality of each broadcast beam in the M broadcast beams; and sending, by the UE, an identifier of a second broadcast beam to the network device, where the second broadcast beam is a highest-quality broadcast beam among the M broadcast beams; and the receiving, by the UE by using the broadcast beam, the broadcast information sent by the network device includes: receiving, by the UE by using the second broadcast beam, the broadcast information sent by the network device.

With reference to the ninth possible implementation manner of the fifth aspect, in a tenth possible implementation manner of the fifth aspect, the performing, by the UE, downlink synchronization, and determining quality of each broadcast beam in the M broadcast beams includes: performing, by the UE, downlink synchronization according to the synchronization signals and/or the training pilots, and determining the quality of each broadcast beam in the M broadcast beams.

With reference to the ninth possible implementation manner of the fifth aspect or the tenth possible implementation manner of the fifth aspect, in an eleventh possible implementation manner of the fifth aspect, the method further includes: determining, by the UE, whether the identifier of the second broadcast beam is the same as an identifier of a broadcast beam used when the UE currently receives broadcast information; and stopping, by the UE, sending the identifier of the second broadcast beam to the network device when the identifier of the second broadcast beam is the same as the identifier of the broadcast beam used when the UE currently receives the broadcast information; or sending, by the UE, the identifier of the second broadcast beam to the network device when the identifier of the second broadcast beam is different from the identifier of the broadcast beam used when the UE currently receives the broadcast information.

With reference to any one of the ninth to eleventh possible implementation manners of the fifth aspect, in a twelfth possible implementation manner of the fifth aspect, after the sending, by the UE, the identifier of the second broadcast beam to the network device, the method further includes: receiving, by the UE, synchronization signals and/or training pilots that are sent by the network device by using H unicast beams, where H is an integer greater than or equal to 2; performing, by the UE, downlink synchronization, and determining quality of each unicast beam in the H unicast beams; sending, by the UE, an identifier of a first unicast beam to the network device, where the first unicast beam is a highest-quality unicast beam among the H unicast beams; and receiving, by the UE by using the first unicast beam, unicast information sent by the network device.

With reference to any one of the first to eighth possible implementation manners of the fifth aspect, in a thirteenth possible implementation manner of the fifth aspect, when the UE is in the second coverage area, the method further includes: receiving, by the UE, synchronization signals and/or training pilots that are sent by the network device by using H unicast beams, where H is an integer greater than or equal to 2; performing, by the UE, downlink synchronization, and determining quality of each unicast beam in the H unicast beams; sending, by the UE, an identifier of a first unicast beam to the network device, where the first unicast beam is a highest-quality unicast beam among the H unicast beams; and receiving, by the UE by using the first unicast beam, unicast information sent by the network device; and the receiving, by the UE by using the unicast beam, the broadcast information sent by the network device includes: receiving, by the UE by using the first unicast beam, the broadcast information sent by the network device.

With reference to the twelfth possible implementation manner of the fifth aspect or the thirteenth possible implementation manner of the fifth aspect, in a fourteenth possible implementation manner of the fifth aspect, the performing, by the UE, downlink synchronization, and determining quality of each unicast beam in the H unicast beams includes: performing, by the UE, downlink synchronization according to the received synchronization signals and/or training pilots that are sent by the network device by using the H unicast beams, and determining the quality of each unicast beam in the H unicast beams.

With reference to any one of the twelfth to fourteenth possible implementation manners of the fifth aspect, in a fifteenth possible implementation manner of the fifth aspect, the method further includes: determining, by the UE, whether the identifier of the first unicast beam is the same as an identifier of a unicast beam used when the UE currently communicates with the network device; and stopping, by the UE, sending the identifier of the first unicast beam to the network device when the identifier of the first unicast beam is the same as the identifier of the unicast beam used when the UE currently communicates with the network device; or sending, by the UE, the identifier of the first unicast beam to the network device when the identifier of the first unicast beam is different from the identifier of the unicast beam used when the UE currently communicates with the network device.

With reference to any one of the twelfth to fifteenth possible implementation manners of the fifth aspect, in a sixteenth possible implementation manner of the fifth aspect, before the receiving, by the UE, synchronization signals and/or training pilots that are sent by the network device by using H unicast beams, the method further includes: receiving, by the UE, configuration information that is sent by the network device and is for the UE to measure the H unicast beams, where the configuration information includes an identifier and/or a sending time of each unicast beam in the H unicast beams; and the receiving, by the UE, synchronization signals and/or training pilots that are sent by the network device by using H unicast beams includes: receiving, by the UE, the synchronization signals and/or the training pilots according to the configuration information at the sending time of each unicast beam in the H unicast beams by using each unicast beam.

With reference to any one of the twelfth to sixteenth possible implementation manners of the fifth aspect, in a seventeenth possible implementation manner of the fifth aspect, the H unicast beams include the service beam of the UE and N adjacent unicast beams, and N is an integer greater than or equal to 1.

With reference to any one of the twelfth to seventeenth possible implementation manners of the fifth aspect, in an eighteenth possible implementation manner of the fifth aspect, the sending, by the UE, the identifier of the first unicast beam to the network device includes: sending, by the UE, identifiers of Y unicast beams to the network device in descending order or ascending order of quality; or sending, by the UE, quality ranking information of Y unicast beams to the network device; where Y is an integer greater than or equal to 1 and less than or equal to H.

With reference to any one of the twelfth to eighteenth possible implementation manners of the fifth aspect, in a nineteenth possible implementation manner of the fifth aspect, after the sending, by the UE, the identifier of the first unicast beam to the network device, the method further includes: receiving, by the UE, first signaling sent by the network device, where the first signaling includes an identifier of a second unicast beam, and the first signaling instructs the UE to use the second unicast beam as the service beam; and switching, by the UE, the service beam of the UE to the second unicast beam according to the first signaling.

With reference to any one of the first to nineteenth possible implementation manners of the fifth aspect, in a twentieth possible implementation manner of the fifth aspect, after the determining, by the UE, that the UE is in the second coverage area, the method further includes: stopping, by the UE, initiating a random access procedure to the network device, or stopping an ongoing random access procedure.

With reference to any one of the first to twentieth possible implementation manners of the fifth aspect, in a twenty-first possible implementation manner of the fifth aspect, after the determining, by the UE, that the UE is in the first coverage area, the method further includes: receiving, by the UE, PRACH configuration information that is sent by the network device by using one broadcast beam; sending, by the UE, a random access preamble to the network device by using an uplink beam on a time-frequency resource indicated by the PRACH configuration information, where the uplink beam has an association relationship with the broadcast beam or a sending direction of the uplink beam is opposite to a sending direction of the broadcast beam; receiving, by the UE, a RAR message sent by the network device, where the RAR message includes an identifier of the random access preamble and uplink authorization information, and the uplink authorization information is used to authorize, to the UE, an uplink time-frequency resource and an uplink beam that are used for communication with the network device; and sending, by the UE, a random access message 3 to the network device by using the uplink beam authorized by the uplink authorization information and on the uplink time-frequency resource authorized by the uplink authorization information, where the random access message 3 includes identifier information of the UE.

With reference to the twenty-first possible implementation manner of the fifth aspect, in a twenty-second possible implementation manner of the fifth aspect, that the uplink authorization information is used to authorize, to the UE, an uplink beam that is used for communication with the network device includes: the uplink authorization information is used to authorize the UE to use all uplink beams to communicate with the network device.

With reference to the fifth aspect or any one of the first to twenty-second possible implementation manners of the fifth aspect, in a twenty-third possible implementation manner of the fifth aspect, the method further includes: when the UE and the network device need cross-carrier scheduling, receiving, by the UE, DCI that is sent by the network device in a first TTI of a scheduling cell, where the DCI indicates radio resource allocation information in K consecutive second TTIs of a scheduled cell, and K is an integer greater than or equal to 2.

With reference to the twenty-third possible implementation manner of the fifth aspect, in a twenty-fourth possible implementation manner of the fifth aspect, the first TTI is K times as large as the second TTI.

With reference to the twenty-third possible implementation manner of the fifth aspect or the twenty-fourth possible implementation manner of the fifth aspect, in a twenty-fifth possible implementation manner of the fifth aspect, the radio resource allocation information is indicated according to unified numbers of PRBs in the K consecutive second TTIs.

With reference to the twenty-fifth possible implementation manner of the fifth aspect, in a twenty-sixth possible implementation manner of the fifth aspect, order of the unified numbers of the PRBs in terms of a time domain is ascending order of time; and order of the unified numbers of the PRBs in terms of a frequency domain is descending order or ascending order of a frequency.

According to a sixth aspect, an embodiment of the present invention further provides an information transmission method, including: determining, by a network device, a type of a coverage area in which UE is located, where the type of the coverage area is a first coverage area or a second coverage area, the first coverage area is an area that is covered by a broadcast beam sent by the network device, the broadcast beam is a beam used when the network device sends broadcast information in a broadcast manner, the second coverage area is an area that is not covered by the broadcast beam sent by the network device and that is in an area that is covered by a unicast beam sent by the network device, and the unicast beam is a beam used when the network device communicates with the UE in a unicast manner; and sending, by the network device, the broadcast information to the UE by using a corresponding beam according to the type of the coverage area in which the UE is located.

In a first possible implementation manner of the sixth aspect, the sending, by the network device, the broadcast information to the UE by using a corresponding beam according to the type of the coverage area in which the UE is located includes: sending, by the network device, the broadcast information to the UE by using the broadcast beam when the type of the coverage area is the first coverage area; or sending, by the network device, the broadcast information to the UE by using the unicast beam when the type of the coverage area is the second coverage area, where a divergence angle of the unicast beam is not greater than a divergence angle of the broadcast beam.

With reference to the sixth aspect or the first possible implementation manner of the sixth aspect, in a second possible implementation manner of the sixth aspect, before the determining, by a network device, a type of a coverage area in which UE is located, the method further includes: receiving, by the network device, first indication information sent by the UE, where the first indication information is used to indicate a type of a coverage area in which the UE is currently located or indicate that the type of the coverage area in which the UE is located changes.

133. The method according to claim 130 or 131, the determining, by a network device, a type of a coverage area in which UE is located includes: determining, by the network device, that the UE is in the second coverage area when quality of a service beam or a first broadcast beam of the UE is less than a preset threshold; or determining, by the network device, that the UE is in the first coverage area when quality of a service beam or a first broadcast beam of the UE is greater than or equal to a preset threshold; where the first broadcast beam is a highest-quality broadcast beam among all broadcast beams currently received by the UE.

With reference to the third possible implementation manner of the sixth aspect, in a fourth possible implementation manner of the sixth aspect, after the determining, by a network device, a type of a coverage area in which UE is located, the method further includes: when the network device determines that the type of the coverage area in which the UE is located changes, sending, by the network device, second indication information to the UE, where the second indication information is used to indicate a type of a coverage area in which the UE is currently located or indicate that the type of the coverage area in which the UE is located changes.

With reference to the third possible implementation manner of the sixth aspect or the fourth possible implementation manner of the sixth aspect, in a fifth possible implementation manner of the fifth aspect, when there are at least two service beams of the UE, that quality of a service beam of the UE is less than a preset threshold includes: quality of a highest-quality service beam among all service beams of the UE is less than the preset threshold.

With reference to any one of the third to fifth possible implementation manners of the sixth aspect, in a sixth possible implementation manner of the sixth aspect, before the determining, by a network device, a type of a coverage area in which UE is located, the method further includes: receiving, by the network device, the quality of the service beam or the first broadcast beam sent by the UE.

With reference to the sixth possible implementation manner of the sixth aspect, in a seventh possible implementation manner of the sixth aspect, the receiving, by the network device, the quality of the service beam or the first broadcast beam sent by the UE includes: receiving, by the network device, the quality of the first broadcast beam sent by the UE when the UE determines that the UE is currently in the first coverage area; or receiving, by the network device, the quality of the service beam sent by the UE when the UE determines that the UE is currently in the second coverage area.

With reference to any one of the third to seventh possible implementation manners of the sixth aspect, in an eighth possible implementation manner of the sixth aspect, quality of the beam is RSRP, RSRQ, or CSI of the beam, and the beam includes the service beam or the first broadcast beam.

With reference to any one of the first to eighth possible implementation manners of the sixth aspect, in a ninth possible implementation manner of the sixth aspect, when the UE is in the first coverage area, the method further includes: sending, by the network device, synchronization signals and/or training pilots to the UE by using M broadcast beams, where M is an integer greater than or equal to 2; receiving, by the network device, an identifier of a second broadcast beam sent by the UE, where the second broadcast beam is a highest-quality broadcast beam among the M broadcast beams; and the sending, by the network device, the broadcast information to the UE by using the unicast beam includes: sending, by the network device, the broadcast information to the UE by using the second broadcast beam.

With reference to the ninth possible implementation manner of the sixth aspect, in a tenth possible implementation manner of the sixth aspect, the identifier of the second broadcast beam is different from an identifier of a broadcast beam used when the network device currently sends broadcast information to the UE.

With reference to the ninth possible implementation manner of the sixth aspect or the tenth possible implementation manner of the sixth aspect, in an eleventh possible implementation manner of the sixth aspect, after the receiving, by the network device, an identifier of a second broadcast beam sent by the UE, the method further includes: sending, by the network device, synchronization signals and/or training pilots to the UE by using H unicast beams, where H is an integer greater than or equal to 2; receiving, by the network device, an identifier of a first unicast beam sent by the UE, where the first unicast beam is a highest-quality unicast beam among the H unicast beams; and sending, by the network device, unicast information to the UE by using the first unicast beam.

With reference to any one of the first to eighth possible implementation manners of the sixth aspect, in a twelfth possible implementation manner of the sixth aspect, when the UE is in the second coverage area, the method further includes: sending, by the network device, synchronization signals and/or training pilots to the UE by using H unicast beams, where H is an integer greater than or equal to 2; receiving, by the network device, an identifier of a first unicast beam sent by the UE, where the first unicast beam is a highest-quality unicast beam among the H unicast beams; and sending, by the network device, unicast information to the UE by using the first unicast beam; and the sending, by the network device, the broadcast information to the UE by using the unicast beam includes: sending, by the network device, the broadcast information to the UE by using the first unicast beam.

With reference to the eleventh possible implementation manner of the sixth aspect or the twelfth possible implementation manner of the sixth aspect, in a thirteenth possible implementation manner of the sixth aspect, the identifier of the first unicast beam is different from an identifier of a unicast beam used when the network device currently communicates with the UE.

With reference to any one of the eleventh to thirteenth possible implementation manners of the sixth aspect, in a fourteenth possible implementation manner of the sixth aspect, before the sending, by the network device, synchronization signals and/or training pilots to the UE by using H unicast beams, the method further includes: sending, by the network device to the UE, configuration information that is for the UE to measure the H unicast beams, where the configuration information includes an identifier and/or a sending time of each unicast beam in the H unicast beams.

With reference to any one of the eleventh to fourteenth possible implementation manners of the sixth aspect, in a fifteenth possible implementation manner of the sixth aspect, the H unicast beams include the service beam of the UE and N adjacent unicast beams, and N is an integer greater than or equal to 1.

With reference to any one of the eleventh to fifteenth possible implementation manners of the sixth aspect, in a sixteenth possible implementation manner of the sixth aspect, the receiving, by the network device, an identifier of a first unicast beam sent by the UE includes: receiving, by the network device, identifiers of Y unicast beams that are sent by the UE in descending order or ascending order of quality; or receiving, by the network device, quality ranking information of Y unicast beams that is sent by the UE; where Y is an integer greater than or equal to 1 and less than or equal to H.

With reference to any one of the eleventh to sixteenth possible implementation manners of the sixth aspect, in a seventeenth possible implementation manner of the sixth aspect, after the receiving, by the network device, an identifier of a first unicast beam sent by the UE, the method further includes: sending, by the network device, first signaling to the UE, where the first signaling includes an identifier of a second unicast beam, and the first signaling instructs the UE to use the second unicast beam as the service beam; and switching, by the network device, the service beam of the UE to the second unicast beam.

With reference to any one of the first to seventeenth possible implementation manners of the sixth aspect, in an eighteenth possible implementation manner of the sixth aspect, after the determining, by the network device, that the UE is in the first coverage area, the method further includes: sending, by the network device, PRACH configuration information by using one broadcast beam; receiving, by the network device, a random access preamble that is sent by the UE by using an uplink beam on a time-frequency resource indicated by the PRACH configuration information, where the uplink beam has an association relationship with the broadcast beam or a sending direction of the uplink beam is opposite to a sending direction of the broadcast beam; sending, by the network device, a RAR message to the UE, where the RAR message includes an identifier of the random access preamble and uplink authorization information, and the uplink authorization information is used to authorize, to the UE, an uplink time-frequency resource and an uplink beam that are used for communication with the network device; and receiving, by the network device, a random access message 3 that is sent by the UE by using the uplink beam authorized by the uplink authorization information and on the uplink time-frequency resource authorized by the uplink authorization information, where the random access message 3 includes identifier information of the UE.

With reference to the eighteenth possible implementation manner of the sixth aspect, in a nineteenth possible implementation manner of the sixth aspect, that the uplink authorization information is used to authorize, to the UE, an uplink beam that is used for communication with the network device includes: the uplink authorization information is used to authorize the UE to use all uplink beams to communicate with the network device.

With reference to the sixth aspect or any one of the first to nineteenth possible implementation manners of the sixth aspect, in a twentieth possible implementation manner of the sixth aspect, the method further includes: when the UE and the network device need cross-carrier scheduling, sending, by the network device, DCI to the UE in a first TTI of a scheduling cell, where the DCI indicates radio resource allocation information in K consecutive second TTIs of a scheduled cell, and K is an integer greater than or equal to 2.

With reference to the twentieth possible implementation manner of the sixth aspect, in a twenty-first possible implementation manner of the sixth aspect, the first TTI is K times as large as the second TTI.

With reference to the twentieth possible implementation manner of the sixth aspect or the twenty-first possible implementation manner of the sixth aspect, in a twenty-second possible implementation manner of the sixth aspect, the radio resource allocation information is indicated according to unified numbers of PRBs in the K consecutive second TTIs.

With reference to the twenty-second possible implementation manner of the sixth aspect, in a twenty-third possible implementation manner of the sixth aspect, order of the unified numbers of the PRBs in terms of a time domain is ascending order of time; and order of the unified numbers of the PRBs in terms of a frequency domain is descending order or ascending order of a frequency.

According to a seventh aspect, an embodiment of the present invention provides an information transmission system, including: the UE provided in the embodiments of the present invention according to the first aspect and the network device provided in the embodiments of the present invention according to the second aspect; or the UE provided in the embodiments of the present invention according to the third aspect and the network device provided in the embodiments of the present invention according to the fourth aspect; where the UE is communicatively connected to the network device.

According to the information transmission method, the device, and the system provided in the embodiments of the present invention, UE determines a type of a coverage area in which the UE is located, and when the type of the coverage area is the first coverage area, the UE receives, by using a corresponding beam according to the type of the coverage area in which the UE is located, broadcast information sent by the network device. Therefore, when the UE is covered in the different coverage areas, the broadcast information sent by the network device can be received, and this ensures normal communication between the UE and the network device.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technical solutions in the present invention are mainly applied to millimeter wave band.

A network device in the present invention may be a base station controller (Base Station Controller, BSC for short) in a GSM system, a GPRS system, or a CDMA system, may be a radio network controller (Radio Network Controller, RNC for short) or a NodeB (NodeB) in a CDMA2000 system or a WCDMA system, may be an evolved NodeB (Evolved NodeB, eNB for short) in an LTE system, or may be a network element such as an access service network base station (Access Service Network Base Station, ASN BS for short) in a WiMAX network. The network device in the present invention may be a dedicated device that is separately set in the present invention.

Figure 1:
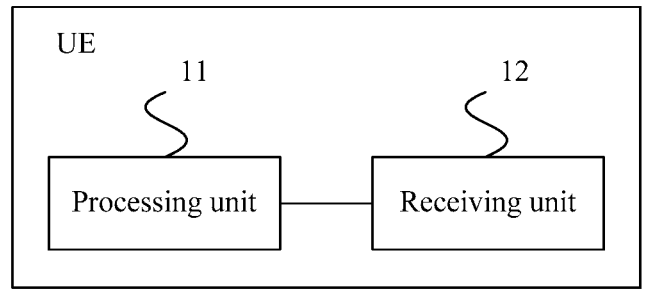
FIG. 1 is a schematic structural diagram of Embodiment 1 of UE according to the present invention.

FIG. 1 is a schematic structural diagram of Embodiment 1 of UE according to the present invention. As shown in FIG. 1, the UE in this embodiment may include a processing unit 11 and a receiving unit 12. The processing unit 11 is configured to determine a type of a coverage area in which the UE is located. The type of the coverage area is a first coverage area or a second coverage area. The first coverage area is an area that is covered by a broadcast beam sent by a network device. The broadcast beam is a beam used when the network device sends broadcast information in a broadcast manner. The second coverage area is an area that is not covered by the broadcast beam sent by the network device and that is in an area that is covered by a unicast beam sent by the network device. The unicast beam is a beam used when the network device communicates with the UE in a unicast manner. The receiving unit 12 is configured to receive, by using a corresponding beam according to the type, determined by the processing unit 11, of the coverage area in which the UE is located, the broadcast information sent by the network device.

Optionally, the receiving unit 12 is configured to: receive, by using the broadcast beam, the broadcast information sent by the network device when the type of the coverage area determined by the processing unit 11 is the first coverage area; or receive, by using the unicast beam, the broadcast information sent by the network device when the type of the coverage area determined by the processing unit 11 is the second coverage area. A divergence angle of the unicast beam is not greater than a divergence angle of the broadcast beam.

The UE in this embodiment may be configured to execute the technical solutions executed by UE in the following method embodiments, implementation principles and technical effects thereof are similar, and details are not described herein.

Figure 2:
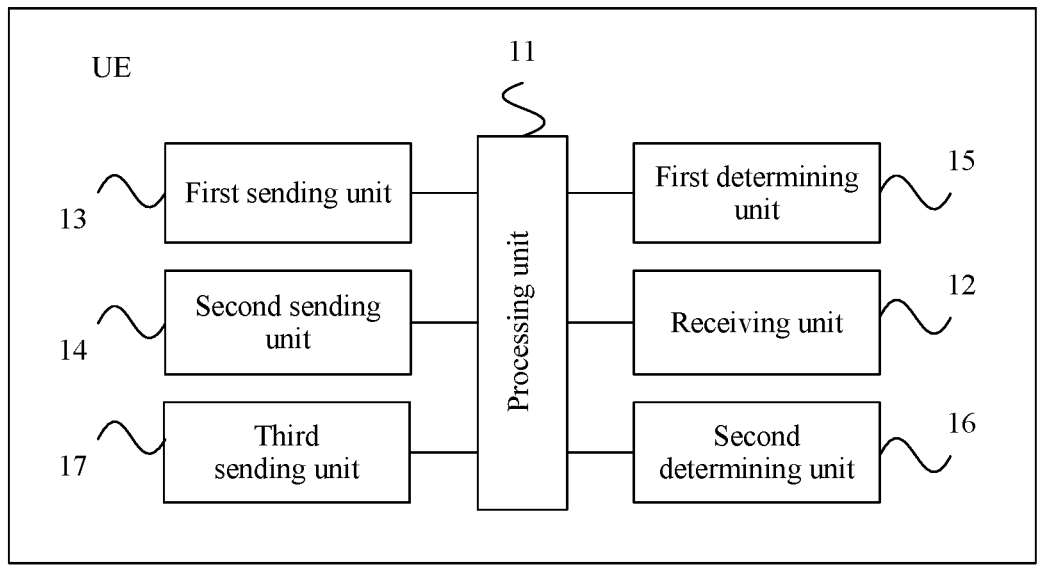
FIG. 2 is a schematic structural diagram of Embodiment 2 of UE according to the present invention.

FIG. 2 is a schematic structural diagram of Embodiment 2 of UE according to the present invention. As shown in FIG. 2, the UE in this embodiment is based on a structure of the UE shown in FIG. 1. Optionally, the processing unit 11 is configured to: determine that the UE is in the second coverage area when quality of a service beam or a first broadcast beam of the UE is less than a preset threshold; or determine that the UE is in the first coverage area when quality of a service beam or a first broadcast beam of the UE is greater than or equal to a preset threshold; where the first broadcast beam is a highest-quality broadcast beam among all broadcast beams currently received by the UE.

Optionally, the UE in this embodiment may further include a first sending unit 13.

In a feasible implementation manner, the first sending unit 13 is configured to: after the processing unit 11 determines the type of the coverage area in which the UE is located, when the processing unit 11 determines that the type of the coverage area in which the UE is located changes, send first indication information to the network device. The first indication information is used to indicate a type of a coverage area in which the UE is currently located or indicate that the type of the coverage area in which the UE is located changes. Optionally, when there are at least two service beams of the UE, that quality of a service beam of the UE is less than a preset threshold includes: quality of a highest-quality service beam among all service beams of the UE is less than the preset threshold.

Optionally, the receiving unit 12 is further configured to: before the processing unit 11 determines the type of the coverage area in which the UE is located, receive second indication information sent by the network device. The second indication information is used to indicate a type of a coverage area in which the UE is currently located or indicate that the type of the coverage area in which the UE is located changes.

In another feasible implementation manner, the first sending unit 13 is configured to: before the receiving unit 12 receives the second indication information sent by the network device, send quality of a service beam or a first broadcast beam to the network device. The first broadcast beam is a highest-quality broadcast beam among all broadcast beams currently received by the UE. Optionally, the first sending unit 13 is configured to: send the quality of the first broadcast beam to the network device when the processing unit 11 determines that the UE is currently in the first coverage area; or send the quality of the service beam to the network device when the processing unit 11 determines that the UE is currently in the second coverage area.

Optionally, quality of the beam is RSRP, RSRQ, or CSI of the beam, and the beam includes the service beam or the first broadcast beam.

Optionally, the UE in this embodiment may further include a second sending unit 14.

In a feasible implementation manner, the receiving unit 12 is further configured to: when the processing unit 11 determines that the UE is in the first coverage area, receive synchronization signals and/or training pilots that are sent by the network device by using M broadcast beams, where M is an integer greater than or equal to 2. The processing unit 11 is further configured to perform downlink synchronization, and determine quality of each broadcast beam in the M broadcast beams. The second sending unit 14 is configured to send an identifier of a second broadcast beam to the network device. The second broadcast beam is a highest-quality broadcast beam among the M broadcast beams. The receiving unit 12 is configured to receive, by using the second broadcast beam, the broadcast information sent by the network device.

Optionally, The processing unit 11 is configured to perform downlink synchronization according to the synchronization signals and/or the training pilots, and determine the quality of each broadcast beam in the M broadcast beams.

Optionally, the UE in this embodiment may further include a first determining unit 15. The first determining unit 15 is configured to: before the second sending unit 14 sends the identifier of the second broadcast beam to the network device, determine whether the identifier of the second broadcast beam is the same as an identifier of a broadcast beam used when the UE currently receives broadcast information. The processing unit 11 is further configured to stop sending the identifier of the second broadcast beam to the network device when the first determining unit 15 determines that the identifier of the second broadcast beam is the same as the identifier of the broadcast beam used when the UE currently receives the broadcast information. Alternatively, the second sending unit 15 is configured to send the identifier of the second broadcast beam to the network device when the first determining unit 15 determines that the identifier of the second broadcast beam is different from the identifier of the broadcast beam used when the UE currently receives the broadcast information.

Optionally, the receiving unit 12 is further configured to: after the second sending unit 14 sends the identifier of the second broadcast beam to the network device, receive synchronization signals and/or training pilots that are sent by the network device by using H unicast beams, where H is an integer greater than or equal to 2. The processing unit 11 is further configured to perform downlink synchronization, and determine quality of each unicast beam in the H unicast beams. The second sending unit 14 is further configured to send an identifier of a first unicast beam to the network device. The first unicast beam is a highest-quality unicast beam among the H unicast beams. The receiving unit 12 is further configured to receive, by using the first unicast beam, unicast information sent by the network device.

In another feasible implementation manner, the receiving unit 12 is further configured to: when the processing unit 11 determines that the UE is in the second coverage area, receive synchronization signals and/or training pilots that are sent by the network device by using H unicast beams, where H is an integer greater than or equal to 2. The processing unit 11 is further configured to perform downlink synchronization, and determine quality of each unicast beam in the H unicast beams. The second sending unit 14 is configured to send an identifier of a first unicast beam to the network device. The first unicast beam is a highest-quality unicast beam among the H unicast beams. The receiving unit 12 is further configured to receive, by using the first unicast beam, unicast information sent by the network device. The receiving unit 12 is configured to receive, by using the first unicast beam, the broadcast information sent by the network device.

Optionally, The processing unit 11 is configured to perform downlink synchronization according to the synchronization signals and/or the training pilots that are received by the receiving unit 12 and that are sent by the network device by using the H unicast beams, and determine the quality of each unicast beam in the H unicast beams.

Optionally, the UE in this embodiment may further include a second determining unit 16. The second determining unit 16 is configured to determine whether the identifier of the first unicast beam is the same as an identifier of a unicast beam used when the UE currently communicates with the network device. The processing unit 11 is further configured to stop sending the identifier of the first unicast beam to the network device when the second determining unit 16 determines that the identifier of the first unicast beam is the same as the identifier of the unicast beam used when the UE currently communicates with the network device. Alternatively, that the second sending unit 14 sends an identifier of a first unicast beam to the network device includes: the second sending unit 14 is configured to send the identifier of the first unicast beam to the network device when the second determining unit 16 determines that the identifier of the first unicast beam is different from the identifier of the unicast beam used when the UE currently communicates with the network device.

Optionally, the receiving unit 12 is further configured to: before receiving the synchronization signals and/or the training pilots that are sent by the network device by using the H unicast beams, receive configuration information that is sent by the network device and is for the UE to measure the H unicast beams. The configuration information includes an identifier and/or a sending time of each unicast beam in the H unicast beams. That the receiving unit 12 receives synchronization signals and/or training pilots that are sent by the network device by using H unicast beams includes: the receiving unit 12 is configured to receive the synchronization signals and/or the training pilots according to the configuration information at the sending time of each unicast beam in the H unicast beams by using each unicast beam.

Optionally, the H unicast beams include the service beam of the UE and N adjacent unicast beams, and N is an integer greater than or equal to 1.

Optionally, that the second sending unit 14 sends the identifier of the first unicast beam to the network device includes: the second sending unit 14 is configured to send identifiers of Y unicast beams to the network device in descending order or ascending order of quality. Alternatively, the second sending unit 14 is configured to send quality ranking information of Y unicast beams to the network device. Y is an integer greater than or equal to 1 and less than or equal to H.

Optionally, the receiving unit 12 is further configured to: after the second sending unit 14 sends the identifier of the first unicast beam to the network device, receive first signaling sent by the network device. The first signaling includes an identifier of a second unicast beam, and the first signaling instructs the UE to use the second unicast beam as the service beam. The processing unit 11 is further configured to switch the service beam of the UE to the second unicast beam according to the first signaling.

Optionally, the processing unit 11 is further configured to: after determining that the UE is in the second coverage area, stop initiating a random access procedure to the network device, or stop an ongoing random access procedure.

Optionally, the UE in this embodiment may further include a third sending unit 17. The receiving unit 12 is further configured to: after the processing unit 11 determines that the UE is in the first coverage area, receive PRACH configuration information that is sent by the network device by using one broadcast beam. The third sending unit 17 is configured to send a random access preamble to the network device by using an uplink beam on a time-frequency resource indicated by the PRACH configuration information. The uplink beam has an association relationship with the broadcast beam or a sending direction of the uplink beam is opposite to a sending direction of the broadcast beam. The receiving unit 12 is further configured to receive a RAR message sent by the network device. The RAR message includes an identifier of the random access preamble and uplink authorization information, and the uplink authorization information is used to authorize, to the UE, an uplink time-frequency resource and an uplink beam that are used for communication with the network device. The third sending unit 17 is further configured to send a random access message 3 to the network device by using the uplink beam authorized by the uplink authorization information and on the uplink time-frequency resource authorized by the uplink authorization information. The random access message 3 includes identifier information of the UE.

Optionally, that the uplink authorization information is used to authorize, to the UE, an uplink beam that is used for communication with the network device includes: the uplink authorization information is used to authorize the UE to use all uplink beams to communicate with the network device.

Optionally, the receiving unit 12 is further configured to: when the UE and the network device need cross-carrier scheduling, receive DCI that is sent by the network device in a first TTI of a scheduling cell. The DCI indicates radio resource allocation information in K consecutive second TTIs of a scheduled cell, and K is an integer greater than or equal to 2.

Optionally, the first TTI is K times as large as the second TTI.

Optionally, the radio resource allocation information is indicated according to unified numbers of PRBs in the K consecutive second TTIs.

Optionally, order of the unified numbers of the PRBs in terms of a time domain is ascending order of time. Order of the unified numbers of the PRBs in terms of a frequency domain is descending order or ascending order of a frequency.

The UE in this embodiment may be configured to execute the technical solutions executed by UE in the following method embodiments, implementation principles and technical effects thereof are similar, and details are not described herein.

Figure 3:
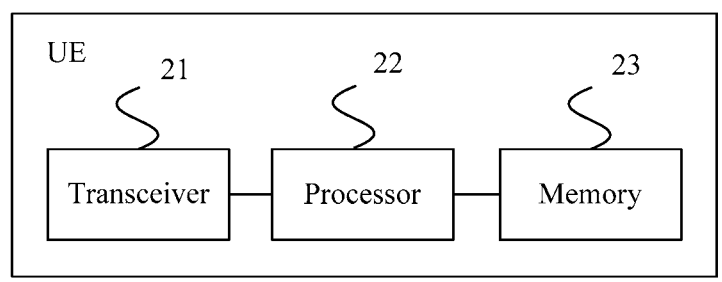
FIG. 3 is a schematic structural diagram of Embodiment 3 of UE according to the present invention.

In hardware implementation, the receiving unit 12 may be a receiver or a transceiver, and the first sending unit 13, the second sending unit 14, and the third sending unit 17 may be a transmitter or a transceiver. The receiving unit 12 may be integrated with the first sending unit 13, the second sending unit 14, and the third sending unit 17 to form a transceiving unit, which corresponds to a transceiver in hardware implementation. The processing unit 11, the first determining unit 15, and the second determining unit 16 may be built in or independent of a processor of the UE in a form of hardware, or may be stored in a memory of the UE in a form of software, so that the processor invokes and executes operations corresponding to the foregoing units. The processor may be a central processing unit (Central Processing Unit, CPU for short), a microprocessor, a single-chip microcomputer, or the like. Referring to FIG. 3, FIG. 3 is a schematic structural diagram of Embodiment 3 of UE in the present invention. As shown in FIG. 3, the UE in this embodiment includes a transceiver 21 and a processor 22. Certainly, the UE may further include general purpose parts such as an antenna, a baseband processing part, an intermediate frequency and radiofrequency processing part, and an input/output apparatus, and no limitation is imposed herein in this embodiment of the present invention. The transceiver 21 and the processor 22 may be configured to execute operations executed by UE in the following method embodiments of the present invention. Optionally, the UE may further include a memory 23. The memory 23 stores a set of program code, and the processor 22 is configured to invoke the program code stored in the memory 23, to execute the operations executed by the UE in the following method embodiments of the present invention.

It should be noted that the UE shown in FIG. 3 may be configured to execute the technical solutions executed by UE in the following method embodiments of the present invention, implementation principles and technical effects thereof are similar, and details are not described herein.

Figure 4:
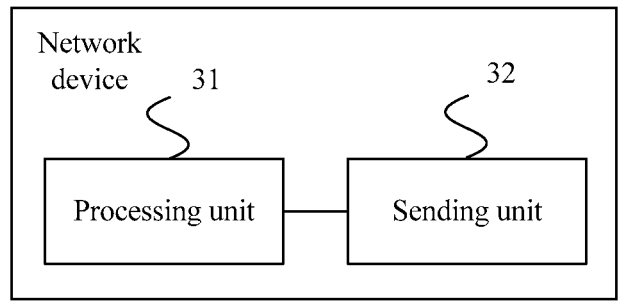
FIG. 4 is a schematic structural diagram of Embodiment 1 of a network device according to the present invention.

FIG. 4 is a schematic structural diagram of Embodiment 1 of a network device according to the present invention. As shown in FIG. 4, the network device in this embodiment may include a processing unit 31 and a sending unit 32. The processing unit 31 is configured to determine a type of a coverage area in which UE is located. The type of the coverage area is a first coverage area or a second coverage area, the first coverage area is an area that is covered by a broadcast beam sent by the network device, the broadcast beam is a beam used when the network device sends broadcast information in a broadcast manner, the second coverage area is an area that is not covered by the broadcast beam sent by the network device and that is in an area that is covered by a unicast beam sent by the network device, and the unicast beam is a beam used when the network device communicates with the UE in a unicast manner. The sending unit 32 is configured to send the broadcast information to the UE by using a corresponding beam according to the type, determined by the processing unit 31, of the coverage area in which the UE is located.

Optionally, the sending unit 32 is configured to: send the broadcast information to the UE by using the broadcast beam when the processing unit 31 determines that the type of the coverage area is the first coverage area; or send the broadcast information to the UE by using the unicast beam when the processing unit 31 determines that the type of the coverage area is the second coverage area. A divergence angle of the unicast beam is not greater than a divergence angle of the broadcast beam.

The network device in this embodiment may be configured to execute the technical solutions executed by a network device in the following method embodiments of the present invention, implementation principles and technical effects thereof are similar, and details are not described herein.

Figure 5:
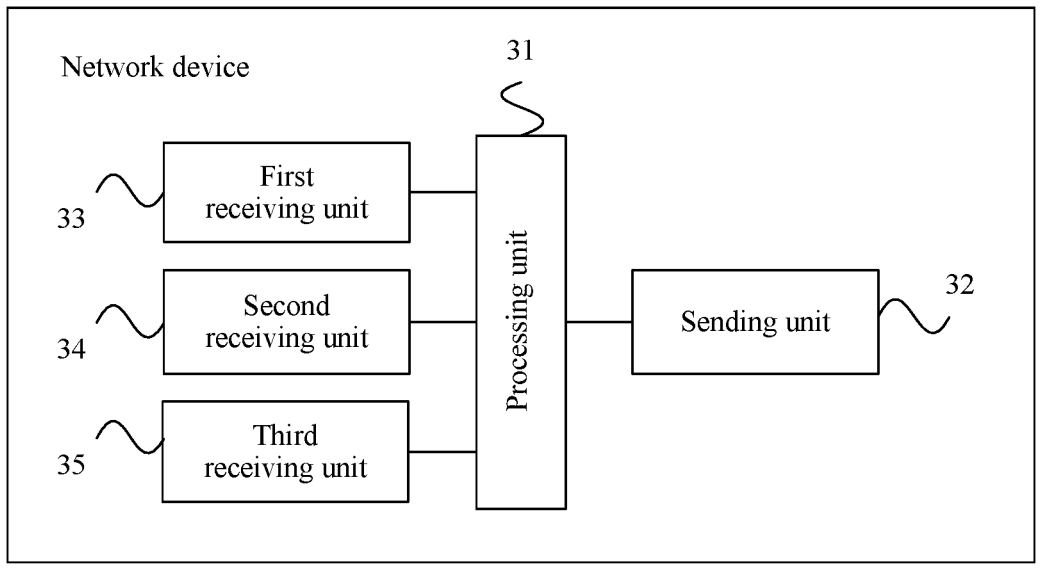
FIG. 5 is a schematic structural diagram of Embodiment 2 of a network device according to the present invention.

FIG. 5 is a schematic structural diagram of Embodiment 2 of a network device according to the present invention. As shown in FIG. 5, the network device in this embodiment, based on a structure of the network device shown in FIG. 4, optionally, may further include a first receiving unit 33.

In a feasible implementation manner, the first receiving unit 33 is configured to: before the processing unit 31 determines the type of the coverage area in which UE is located, receive first indication information sent by the UE. The first indication information is used to indicate a type of a coverage area in which the UE is currently located or indicate that the type of the coverage area in which the UE is located changes.

Optionally, the processing unit 31 is configured to: determine that the UE is in the second coverage area when quality of a service beam or a first broadcast beam of the UE is less than a preset threshold; or determine that the UE is in the first coverage area when quality of a service beam or a first broadcast beam of the UE is greater than or equal to a preset threshold; where the first broadcast beam is a highest-quality broadcast beam among all broadcast beams currently received by the UE.

In another feasible implementation manner, the sending unit 32 is further configured to: after the processing unit 31 determines the type of the coverage area in which UE is located, when the processing unit 31 determines that the type of the coverage area in which the UE is located changes, send second indication information to the UE. The second indication information is used to indicate a type of a coverage area in which the UE is currently located or indicate that the type of the coverage area in which the UE is located changes.

Optionally, when there are at least two service beams of the UE, that quality of a service beam of the UE is less than a preset threshold includes: quality of a highest-quality service beam among all service beams of the UE is less than the preset threshold.

Optionally, the first receiving unit 33 is configured to: before the processing unit 31 determines the type of the coverage area in which UE is located, receive the quality of the service beam or the first broadcast beam sent by the UE.

Optionally, the first receiving unit 33 is configured to: receive the quality of the first broadcast beam sent by the UE when the processing unit 31 determines that the UE is currently in the first coverage area; or receive the quality of the service beam sent by the UE when the processing unit 31 determines that the UE is currently in the second coverage area.

Optionally, quality of the beam is RSRP, RSRQ, or CSI of the beam, and the beam includes the service beam or the first broadcast beam.

Optionally, the network device in this embodiment may further include a second receiving unit 34.

In a feasible implementation manner, the sending unit 32 is further configured to: when the processing unit 31 determines that the UE is in the first coverage area, send synchronization signals and/or training pilots to the UE by using M broadcast beams, where M is an integer greater than or equal to 2. The second receiving unit 34 is configured to receive an identifier of a second broadcast beam sent by the UE. The second broadcast beam is a highest-quality broadcast beam among the M broadcast beams. The sending unit 32 is configured to send the broadcast information to the UE by using the second broadcast beam.

Optionally, the identifier of the second broadcast beam is different from an identifier of a broadcast beam used when the network device currently sends broadcast information to the UE.

Optionally, the sending unit 32 further configured to: after the second receiving unit 34 receives the identifier of the second broadcast beam sent by the UE, send synchronization signals and/or training pilots to the UE by using H unicast beams, where H is an integer greater than or equal to 2. The second receiving unit 34 is further configured to receive an identifier of a first unicast beam sent by the UE. The first unicast beam is a highest-quality unicast beam among the H unicast beams. The sending unit 32 is further configured to send unicast information to the UE by using the first unicast beam.

In another feasible implementation manner, the sending unit 32 is configured to: when the processing unit 31 determines that the UE is in the second coverage area, send synchronization signals and/or training pilots to the UE by using H unicast beams, where H is an integer greater than or equal to 2. The second receiving unit 34 is configured to receive an identifier of a first unicast beam sent by the UE. The first unicast beam is a highest-quality unicast beam among the H unicast beams. The sending unit 32 is further configured to send unicast information to the UE by using the first unicast beam. The sending unit 32 is configured to send the broadcast information to the UE by using the first unicast beam.

Optionally, the identifier of the first unicast beam is different from an identifier of a unicast beam used when the network device currently communicates with the UE.

Optionally, the sending unit 32 is further configured to: before sending the synchronization signals and/or the training pilots to the UE by using the H unicast beams, send, to the UE, configuration information that is for the UE to measure the H unicast beams. The configuration information includes an identifier and/or a sending time of each unicast beam in the H unicast beams.

Optionally, the H unicast beams include the service beam of the UE and N adjacent unicast beams, and N is an integer greater than or equal to 1.

Optionally, The second receiving unit 34 is configured to: receive identifiers of Y unicast beams that are sent by the UE in descending order or ascending order of quality; or the second receiving unit 34 is configured to receive quality ranking information of Y unicast beams that is sent by the UE. Y is an integer greater than or equal to 1 and less than or equal to H.

Optionally, the sending unit 32 is further configured to: after the second receiving unit 34 receives the identifier of the first unicast beam sent by the UE, send first signaling to the UE. The first signaling includes an identifier of a second unicast beam, and the first signaling instructs the UE to use the second unicast beam as the service beam. The processing unit 31 is further configured to switch the service beam of the UE to the second unicast beam.

Optionally, the network device in this embodiment may further include a third receiving unit 35. The sending unit 32 is further configured to: after the processing unit 31 determines that the UE is in the first coverage area, send PRACH configuration information by using one broadcast beam. The third receiving unit 35 is configured to receive a random access preamble that is sent by the UE by using an uplink beam on a time-frequency resource indicated by the PRACH configuration information. The uplink beam has an association relationship with the broadcast beam or a sending direction of the uplink beam is opposite to a sending direction of the broadcast beam. The sending unit 32 is further configured to send a RAR message to the UE. The RAR message includes an identifier of the random access preamble and uplink authorization information, and the uplink authorization information is used to authorize, to the UE, an uplink time-frequency resource and an uplink beam that are used for communication with the network device. The third receiving unit 35 is further configured to receive a random access message 3 that is sent by the UE by using the uplink beam authorized by the uplink authorization information and on the uplink time-frequency resource authorized by the uplink authorization information. The random access message 3 includes identifier information of the UE.

Optionally, that the uplink authorization information is used to authorize, to the UE, an uplink beam that is used for communication with the network device includes: the uplink authorization information is used to authorize the UE to use all uplink beams to communicate with the network device.

Optionally, the sending unit 32 is further configured to: when the UE and the network device need cross-carrier scheduling, send DCI to the UE in a first TTI of a scheduling cell. The DCI indicates radio resource allocation information in K consecutive second TTIs of a scheduled cell, and K is an integer greater than or equal to 2.

Optionally, the first TTI is K times as large as the second TTI.

Optionally, the radio resource allocation information is indicated according to unified numbers of PRBs in the K consecutive second TTIs.

Optionally, order of the unified numbers of the PRBs in terms of a time domain is ascending order of time. Order of the unified numbers of the PRBs in terms of a frequency domain is descending order or ascending order of a frequency.

The network device in this embodiment may be configured to execute the technical solutions executed by a network device in the following method embodiments, implementation principles and technical effects thereof are similar, and details are not described herein.

Figure 6:
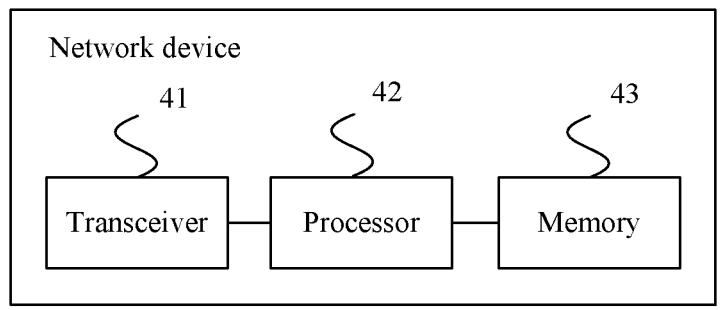
FIG. 6 is a schematic structural diagram of Embodiment 3 of a network device according to the present invention.

In hardware implementation, the sending unit 32 may be a receiver or a transceiver, and the first receiving unit 33, the second receiving unit 34, and the third receiving unit 35 may be a transmitter or a transceiver. The sending unit 32 may be integrated with the first receiving unit 33, the second receiving unit 34, and the third receiving unit 35 to form a transceiving unit, which corresponds to a transceiver in hardware implementation. The processing unit 31 may be built in or independent of a processor of the network device in a form of hardware, or may be stored in a memory of the network device in a form of software, so that the processor invokes and executes operations corresponding to the foregoing units. The processor may be a CPU, a microprocessor, a single-chip microcomputer, or the like. Referring to FIG. 6, FIG. 6 is a schematic structural diagram of Embodiment 3 of a network device according to the present invention. As shown in FIG. 6, the network device in this embodiment includes a transceiver 41 and a processor 42. Certainly, the network device may further include general purpose parts such as an antenna, a baseband processing part, a mid-radiofrequency processing part, and an input/output apparatus, and no limitation is imposed herein in this embodiment of the present invention. The transceiver 41 and the processor 42 may be configured to execute operations executed by a network device in the following method embodiments of the present invention. Optionally, the network device may further include a memory 43. The memory 43 stores a set of program code, and the processor 42 is configured to invoke the program code stored in the memory 43, to execute the operations executed by the network device in the following method embodiments of the present invention.

It should be noted that the network device shown in FIG. 6 may be configured to execute the technical solutions executed by the network device in the following method embodiments of the present invention, implementation principles and technical effects thereof are similar, and details are not described herein.

Figure 7:
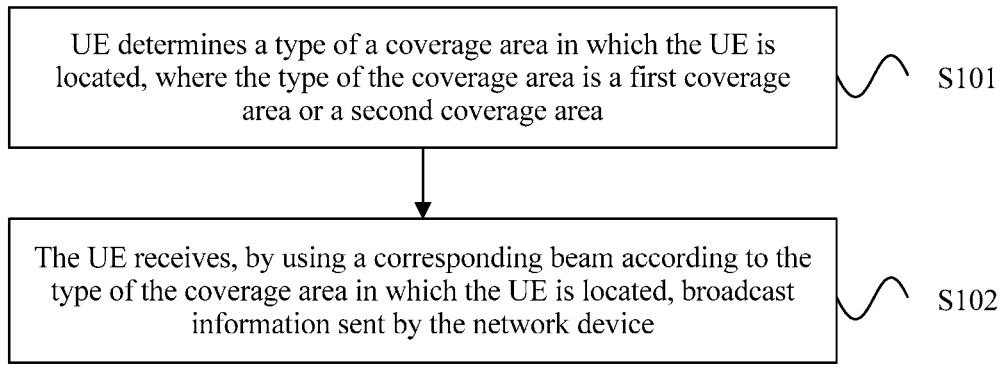
FIG. 7 is a flowchart of Embodiment 1 of an information transmission method according to the present invention.

FIG. 7 is a flowchart of Embodiment 1 of an information transmission method according to the present invention. As shown in FIG. 7, the method in this embodiment may include the following steps.

S101. UE determines a type of a coverage area in which the UE is located, where the type of the coverage area is a first coverage area or a second coverage area.

Figure 8:
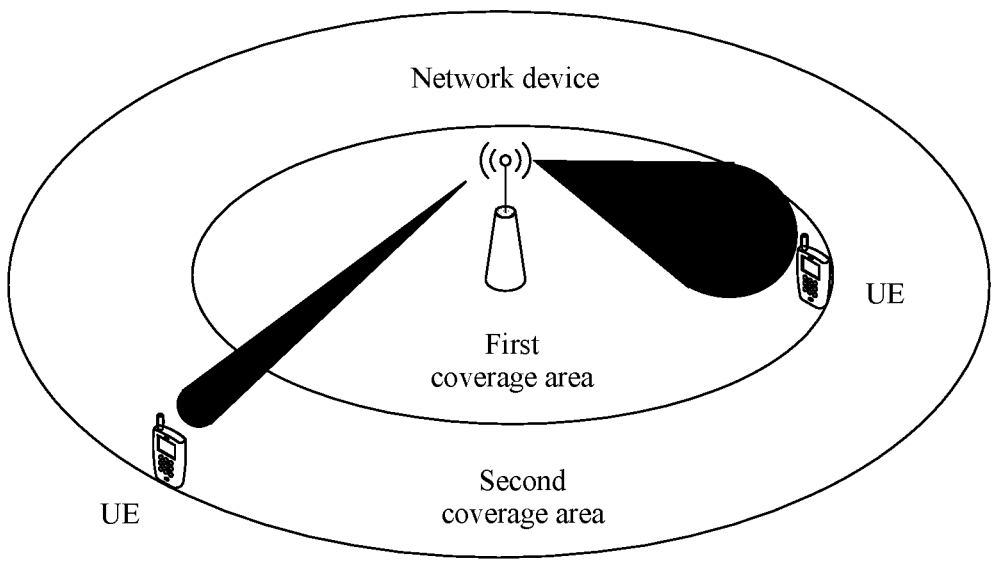
FIG. 8 is a schematic diagram of a first coverage area and a second coverage area provided in an embodiment of the present invention.

In this embodiment, the UE may determine that the coverage area in which the UE is located is the first coverage area or the second coverage area. The coverage area is an area, in which a network device serving the UE can provide a service, in a current serving cell. The first coverage area is an area that can be covered by a broadcast beam sent by the network device, that is, an area that can be covered when the broadcast beam sent by the network device scans all around. Alternatively, the first coverage area is an area that can be covered by all broadcast beams sent by the network device, that is, an area in which the network device serving the UE can provide a broadcast service to the UE. The area of the small circle shown in FIG. 8 represents the first coverage area. The broadcast beam is a beam used when the network device sends broadcast information in a broadcast manner. The broadcast manner indicates that a same signal sent by the network device can be received by multiple UEs, that is, the broadcast manner is a transmission manner in which no particular receiving UE is specified, and a target object of information is all UEs in a broadcast coverage area. The second coverage area is an area that is not covered by the broadcast beam sent by the network device and that is in an area that is covered by a unicast beam sent by the network device. The area covered by the unicast beam is an area that can be covered when the unicast beam sent by the network device scans all around. Alternatively, the area covered by the unicast beam is an area that can be covered by all unicast beams sent by the network device. Referring to the area of the big circle shown in FIG. 8, the second coverage area is an area of a difference between the area covered by the unicast beam and the first coverage area, as shown in an area, except the area of the small circle, in the area of the big circle in FIG. 8. The unicast beam is a beam used when the network device communicates with the UE in a unicast manner. The unicast manner indicates that a signal sent by the network device is received by one UE. That is, the unicast manner is a transmission manner in which particular receiving UE is specified, and a target object of information is the specified UE.

Optionally, the determining, by UE, a type of a coverage area in which the UE is located includes: determining, by the UE, that the UE is in the second coverage area when quality of a service beam or a first broadcast beam of the UE is less than a preset threshold; or determining, by the UE, that the UE is in the first coverage area when quality of a service beam or a first broadcast beam of the UE is greater than or equal to a preset threshold; where the first broadcast beam is a highest-quality broadcast beam among all broadcast beams currently received by the UE. The first coverage area is relative to the second coverage area. That UE is closer to the network device and therefore quality of a service beam or a first broadcast beam is higher indicates that the UE is in a first coverage area. That quality of a service beam or a first broadcast beam is poorer indicates that UE is in a second coverage area. If the quality of the service beam is so poor that the network device is no longer suitable for providing a service to the UE by using a current cell, the network device triggers a handover procedure to hand over the UE to another cell. Quality of the beam is represented by RSRP, RSRQ, or CSI of the beam, or by another radio signal strength or signal-to-noise ratio related parameter.

S102. The UE receives, by using a corresponding beam according to the type of the coverage area in which the UE is located, broadcast information sent by the network device.

In this embodiment, when the UE determines that the UE is in the first coverage area, the network device may send, by using the broadcast beam, the broadcast information to all UEs in the area that can be covered by the broadcast beam. The UE may receive, by using the broadcast beam, the broadcast information sent by the network device, so that the UE can receive, in the first coverage area, the broadcast information sent by the network device. A divergence angle of the broadcast beam may be greater than a preset angle. For example, the broadcast beam may also be referred to as a broad beam.

In this embodiment, when the UE determines that the UE is in the second coverage area, the UE cannot receive the broadcast information that is sent by the network device by using the broadcast beam. Therefore, the network device can send the broadcast information to the UE by using the unicast beam, in order that the UE can receive the broadcast information to ensure normal communication between the UE and the network device. The UE receives the broadcast information by using the unicast beam. Therefore, the UE can receive, in the second coverage area, the broadcast information sent by the network device, and normal communication between the UE and the network device is ensured. A divergence angle of the unicast beam is not greater than the divergence angle of the broadcast beam. For example, the divergence angle of the unicast beam may be less than or equal to the preset angle. At same transmit power, a transmission distance of the unicast beam is greater than a transmission distance of the broadcast beam. For example, the unicast beam may also be referred to as a narrow beam.

According to this embodiment, UE determines a type of a coverage area in which the UE is located, and the UE receives, by using a corresponding beam according to the type of the coverage area in which the UE is located, broadcast information sent by the network device. Therefore, when the UE is covered in the different coverage areas, the broadcast information sent by the network device can be received, and this ensures normal communication between the UE and the network device.

Figure 9:
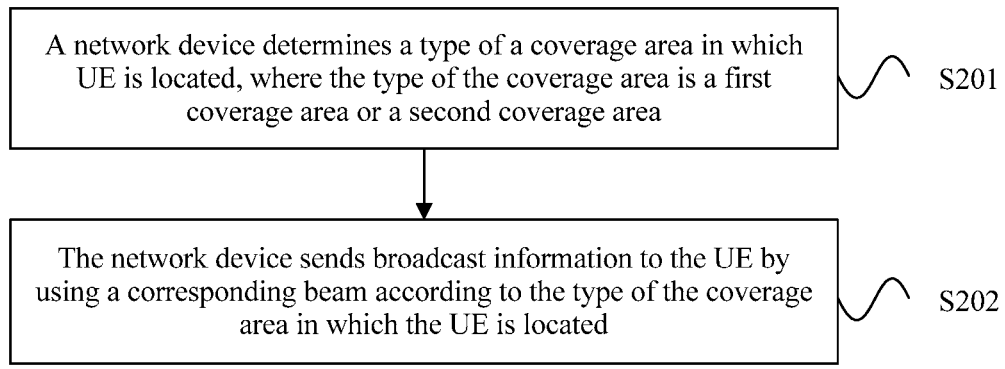
FIG. 9 is a flowchart of Embodiment 2 of an information transmission method according to the present invention.

FIG. 9 is a flowchart of Embodiment 2 of an information transmission method according to the present invention. As shown in FIG. 9, the method in this embodiment may include the following steps.

S201. A network device determines a type of a coverage area in which UE is located, where the type of the coverage area is a first coverage area or a second coverage area.

In this embodiment, the network device may determine that the coverage area in which the UE is located is the first coverage area or the second coverage area. The first coverage area is an area that is covered by a broadcast beam sent by the network device, the broadcast beam is a beam used when the network device sends broadcast information in a broadcast manner, the second coverage area is an area that is not covered by the broadcast beam sent by the network device and that is in an area that is covered by a unicast beam sent by the network device, and the unicast beam is a beam used when the network device communicates with the UE in a unicast manner. For detailed descriptions of the coverage area, the first coverage area, the second coverage area, the broadcast manner, and the unicast manner, refer to related descriptions in Embodiment 1 of the method in the present invention, and details are not described herein.

Optionally, the determining, by a network device, a type of a coverage area in which UE is located includes: determining, by the network device, that the UE is in the second coverage area when quality of a service beam or a first broadcast beam of the UE is less than a preset threshold; or determining, by the network device, that the UE is in the first coverage area when quality of a service beam or a first broadcast beam of the UE is greater than or equal to a preset threshold. The broadcast beam of highest quality is a highest-quality broadcast beam among all broadcast beams received by the UE. The first broadcast beam is a highest-quality broadcast beam among all broadcast beams currently received by the UE.

Optionally, the determining, by a network device, a type of a coverage area in which the UE is located includes: determining, by the network device according to a beam quality report or a channel sounding reference signal (Sounding Reference Signal, SRS for short) fed back by the UE or a receiving status of another uplink signal sent by the UE, the type of the coverage area in which the UE is located.

S202. The network device sends broadcast information to the UE by using a corresponding beam according to the type of the coverage area in which the UE is located.

In this embodiment, when the network device determines that the UE is in the first coverage area, the network device may send, by using the broadcast beam, the broadcast information to all UEs in an area that can be covered by the broadcast beam. Correspondingly, the UE may receive, by using the broadcast beam, the broadcast information sent by the network device, so that the network device can send the broadcast information to the UE when the UE is in the first coverage area.

In this embodiment, when the network device determines that the UE is in the second coverage area, the UE cannot receive the broadcast information that is sent by the network device by using the broadcast beam. Therefore, the network device can send the broadcast information to the UE by using the unicast beam, in order that the UE can receive the broadcast information to ensure normal communication between the UE and the network device. The UE receives the broadcast information by using the unicast beam. A divergence angle of the unicast beam is not greater than a divergence angle of the broadcast beam. Therefore, the network device can send the broadcast information to the UE when the UE is in the second coverage area, and normal communication between the UE and the network device is ensured.

It should be noted that when the network device determines that the UE is in the second coverage area, the network device can send the broadcast information to the UE by using the unicast beam, and can further send the broadcast information to another UE by using the broadcast beam.

In this embodiment, a network device determines a type of a coverage area in which UE is located, and when the type of the coverage area is the first coverage area, the network device sends broadcast information to the UE by using the broadcast beam, or when the type of the coverage area is the second coverage area, the network device sends broadcast information to the UE by using the unicast beam. Therefore, when the UE is covered in the different coverage areas, the network device can send the broadcast information to the UE, and this ensures normal communication between the UE and the network device.

Figure 10:
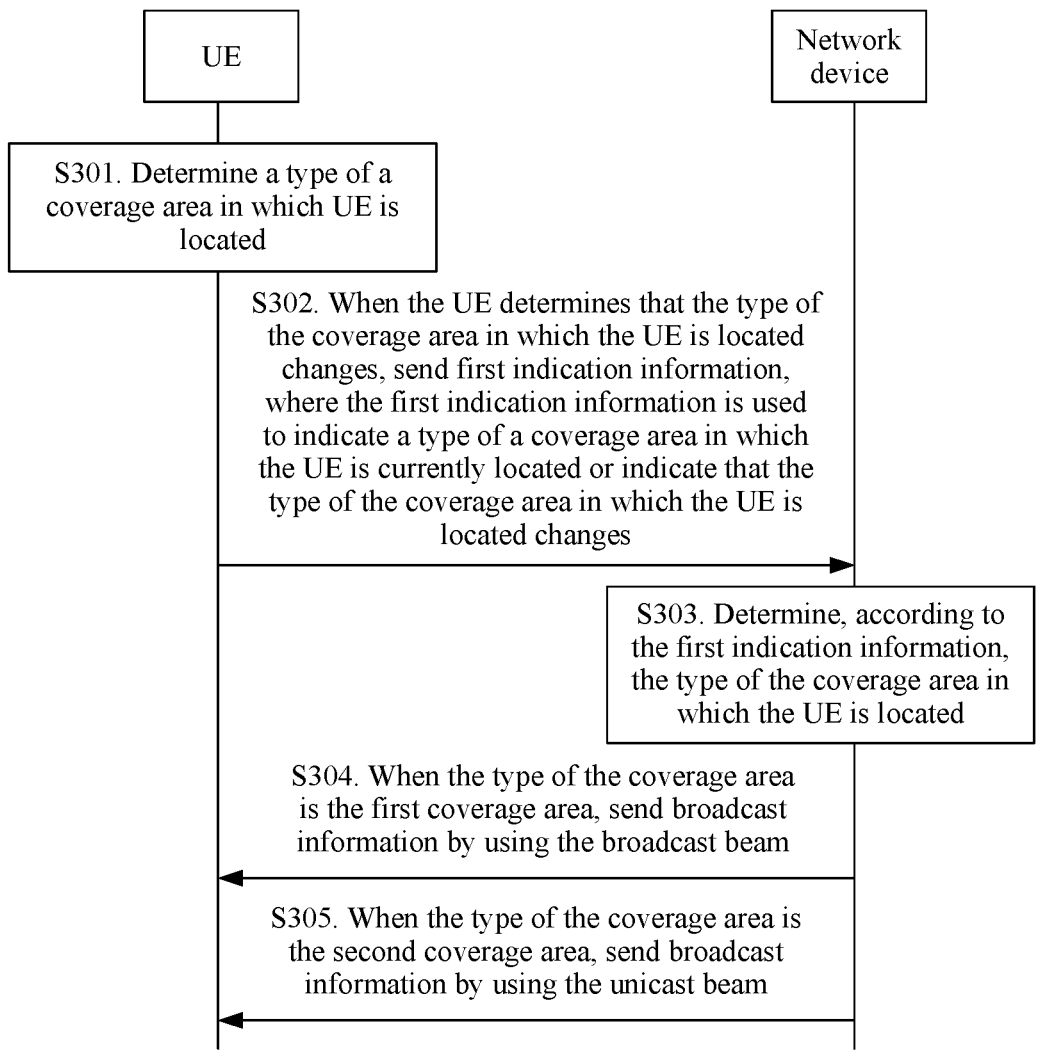
FIG. 10 is a flowchart of Embodiment 3 of an information transmission method according to the present invention.

FIG. 10 is a flowchart of Embodiment 3 of an information transmission method according to the present invention. As shown in FIG. 10, the method in this embodiment may include the following steps.

S301. UE determines a type of a coverage area in which the UE is located.

In this embodiment, the UE may determine whether quality of a service beam or a first broadcast beam of the UE is less than a preset threshold. The first broadcast beam is a highest-quality broadcast beam among all broadcast beams currently received by the UE. When the quality of the service beam or the first broadcast beam of the UE is less than the preset threshold, the UE determines that the UE is in a second coverage area. When the quality of the service beam or the first broadcast beam of the UE is not less than the preset threshold, the UE determines that the UE is in a first coverage area. The preset threshold may be configured by the network device for the UE.

For detailed descriptions related to the first coverage area and the second coverage area, refer to related descriptions in Embodiment 1 of the method in the present invention, and details are not described herein.

Optionally, when there are at least two service beams of the UE, that the quality of the service beam of the UE is less than the preset threshold includes: quality of a highest-quality service beam among all service beams of the UE is less than the preset threshold.

S302. When the UE determines that the type of the coverage area in which the UE is located changes, the UE sends first indication information to the network device, where the first indication information is used to indicate a type of a coverage area in which the UE is currently located or indicate that the type of the coverage area in which the UE is located changes.

In this embodiment, if the UE previously determines that the UE is in the first coverage area but the UE currently determines that the UE is in the second coverage area, the UE determines that the type of the coverage area in which the UE is located changes. The UE sends the first indication information to the network device. The first indication information is used to indicate that the coverage area in which the UE is currently located is the second coverage area or the type of the coverage area in which the UE is located changes, that is, changes from the first coverage area to the second coverage area. If the UE previously determines that the UE is in the second coverage area but the UE currently determines that the UE is in the first coverage area due to moving, the UE determines that the type of the coverage area in which the UE is located changes. The UE sends the first indication information to the network device. The first indication information is used to indicate that the coverage area in which the UE is currently located is the first coverage area or the type of the coverage area in which the UE is located changes, that is, changes from the second coverage area to the first coverage area.

S303. The network device determines, according to the first indication information, the type of the coverage area in which the UE is located.

In this embodiment, the network device receives the first indication information sent by the UE. When the first indication information indicates that the coverage area in which the UE is currently located is the first coverage area or the type of the coverage area in which the UE is located changes from the second coverage area to the first coverage area, the network device determines that the UE is in the first coverage area. When the first indication information indicates that the coverage area in which the UE is currently located is the second coverage area or the type of the coverage area in which the UE is located changes from the first coverage area to the second coverage area, the network device determines that the UE is in the second coverage area. After S303 is executed, the network device in this embodiment executes S304 or S305 according to the first indication information.

S304. When the type of the coverage area is the first coverage area, the network device sends broadcast information to the UE by using the broadcast beam.

In this embodiment, when the network device determines that the type of the coverage area in which the UE is located is the first coverage area, the network device sends the broadcast information to the UE by using the broadcast beam. Correspondingly, the UE receives, by using the broadcast beam, the broadcast information sent by the network device. Therefore, the UE can receive, in the first coverage area, the broadcast information sent by the network device.

S305. When the type of the coverage area is the second coverage area, the network device sends broadcast information to the UE by using the unicast beam.

In this embodiment, when the network device determines that the type of the coverage area in which the UE is located is the second coverage area, the network device sends the broadcast information to the UE by using the unicast beam. Correspondingly, the UE receives, by using the unicast beam, the broadcast information sent by the network device. Therefore, the UE can receive, in the second coverage area, the broadcast information sent by the network device.

In this embodiment, UE determines a type of a coverage area in which the UE is located, and when the type of the coverage area changes, the UE notifies a network device of the type of the coverage area in which the UE is located. Then, the network device sends broadcast information to the UE by using a broadcast beam according to that the UE is in a first coverage area, or the network device sends broadcast information to the UE by using a unicast beam according to that the UE is in a second coverage area. Therefore, when the UE is covered in the different coverage areas, the network device can send the broadcast information to the UE, and this ensures normal communication between the UE and the network device.

Figure 11:
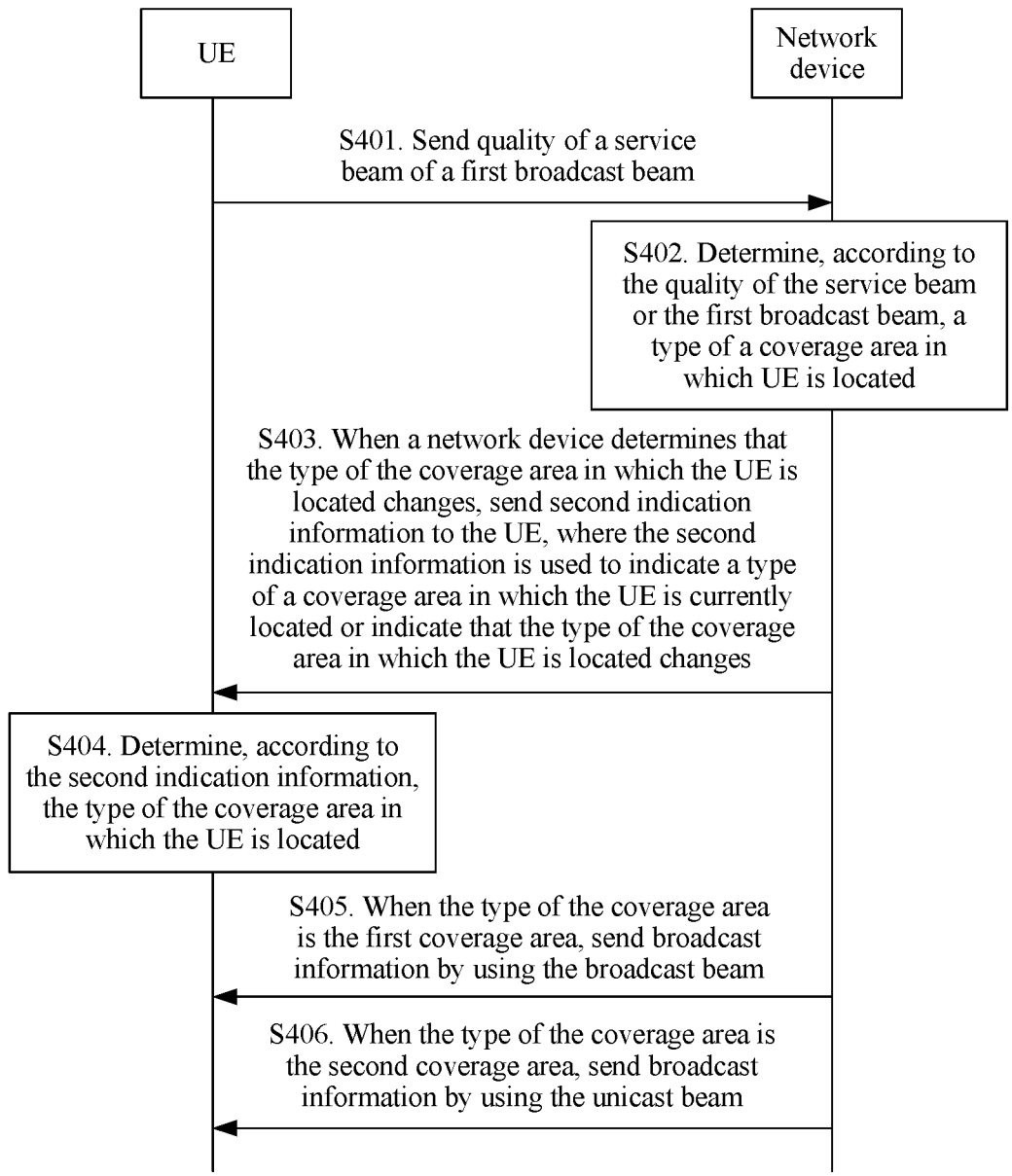
FIG. 11 is a flowchart of Embodiment 4 of an information transmission method according to the present invention.

FIG. 11 is a flowchart of Embodiment 4 of an information transmission method according to the present invention. As shown in FIG. 11, the method in this embodiment may include the following steps.

S401. The UE sends quality of a service beam or a first broadcast beam to the network device.

The first broadcast beam is a highest-quality broadcast beam among all broadcast beams currently received by the UE.

S402. The network device determines, according to the quality of the service beam or the first broadcast beam, a type of a coverage area in which the UE is located.

In this embodiment, the network device may receive the quality of the service beam or the first broadcast beam sent by the UE, and then determine whether the quality of the service beam of the first broadcast beam is less than a preset threshold. The network device determines that the UE is in the second coverage area when the quality of the service beam or the first broadcast beam of the UE is less than the preset threshold. The network device determines that the UE is in the first coverage area when the quality of the service beam or the first broadcast beam of the UE is not less than the preset threshold. The first broadcast beam is the highest-quality broadcast beam among all the broadcast beams currently received by the UE.

Optionally, when there are at least two service beams of the UE, that the quality of the service beam of the UE is less than the preset threshold includes: quality of the highest-quality service beam among all the service beams of the UE is less than the preset threshold.

In a feasible implementation manner, the quality of the service beam sent by the UE to the network device in S401 is the quality of the highest-quality service beam among all the service beams of the UE.

In another feasible implementation manner, the quality of the service beam sent by the UE to the network device in S401 is quality of all the service beams of the UE. Correspondingly, in S402, the network device selects the quality of the highest-quality service beam from all the service beams of the UE, and determines the type of the coverage area in which the UE is located.

S403. When the network device determines that the type of the coverage area in which the UE is located changes, the network device sends second indication information to the UE, where the second indication information is used to indicate a type of a coverage area in which the UE is currently located or indicate that the type of the coverage area in which the UE is located changes.

In this embodiment, if the network device previously determines that the UE is in the first coverage area but the UE currently determines that the UE is in the second coverage area, the network device determines that the type of the coverage area in which the UE is located changes. The network device sends the second indication information to the UE. The second indication information is used to indicate that the coverage area in which the UE is currently located is the second coverage area or the type of the coverage area in which the UE is located changes, that is, changes from the first coverage area to the second coverage area. If the network device previously determines that the UE is in the second coverage area but the network device currently determines that the UE is in the first coverage area, the network device determines that the type of the coverage area in which the UE is located changes. The network device sends the second indication information to the UE. The second indication information is used to indicate that the coverage area in which the UE is currently located is the first coverage area or the type of the coverage area in which the UE is located changes, that is, changes from the second coverage area to the first coverage area.

S404. The UE determines, according to the second indication information, the type of the coverage area in which the UE is located.

In this embodiment, the UE receives the second indication information sent by the network device. When the second indication information indicates that the coverage area in which the UE is currently located is the first coverage area or the type of the coverage area in which the UE is located changes from the second coverage area to the first coverage area, the UE determines that the UE is in the first coverage area. When the second indication information indicates that the coverage area in which the UE is currently located is the second coverage area or the type of the coverage area in which the UE is located changes from the first coverage area to the second coverage area, the UE determines that the UE is in the second coverage area. After S404 is executed, the network device in this embodiment may execute S405 or S406.

S405. When the type of the coverage area is the first coverage area, the network device sends broadcast information to the UE by using the broadcast beam.

In this embodiment, when the network device determines that the type of the coverage area in which the UE is located is the first coverage area, the network device sends the broadcast information to the UE by using the broadcast beam. Correspondingly, the UE receives, by using the broadcast beam, the broadcast information sent by the network device. Therefore, the UE can receive, in the first coverage area, the broadcast information sent by the network device.

S406. When the type of the coverage area is the second coverage area, the network device sends broadcast information to the UE by using the unicast beam.

In this embodiment, when the network device determines that the type of the coverage area in which the UE is located is the second coverage area, the network device sends the broadcast information to the UE by using the unicast beam. Correspondingly, the UE receives, by using the unicast beam, the broadcast information sent by the network device. Therefore, the UE can receive, in the second coverage area, the broadcast information sent by the network device.

Optionally, the foregoing S401 may be: when the UE determines that the UE is currently in the first coverage area, the UE sends the quality of the first broadcast beam to the network device. That is, before the foregoing S401 is executed, the UE receives indication information that is sent by the network device and indicates that the UE is in the first coverage area. The UE determines, according to the indication information, that the UE is currently in the first coverage area, and then the UE sends the quality of the first broadcast beam to the network device. The network device receives the quality of the first broadcast beam sent by the UE. Alternatively, when the UE determines that the UE is currently in the second coverage area, the UE sends the quality of the service beam to the network device. That is, before the foregoing S401 is executed, the UE receives indication information that is sent by the network device and indicates that the UE is in the second coverage area. The UE determines, according to the indication information, that the UE is currently in the second coverage area, and then the UE sends the quality of the service beam to the network device. The network device receives the quality of the service beam sent by the UE.

In this embodiment, UE sends quality of a service beam or a first broadcast beam to a network device; the network device determines, according to the quality of the service beam or the first broadcast beam, a type of a coverage area in which the UE is located, and when the type of the coverage area changes, the network device notifies the UE of the type of the coverage area in which the UE is located. Then, the network device sends broadcast information to the UE by using a broadcast beam according to that the UE is in a first coverage area, or the network device sends broadcast information to the UE by using a unicast beam according to that the UE is in a second coverage area. Therefore, when the UE is covered in the different coverage areas, the network device can send the broadcast information to the UE, and this ensures normal communication between the UE and the network device.

Based on Embodiment 3 or Embodiment 4 of the foregoing method, optionally, quality of the beam is represented by reference signal received power (Reference Signal Receiving Power, RSRP for short), reference signal received quality (Reference Signal Receiving Quality, RSRQ for short), or channel state indication (Channel State Indication, CSI for short) of the beam, or by another radio signal strength or signal-to-noise ratio related parameter. The beam includes the service beam or the first broadcast beam.

Figure 12:
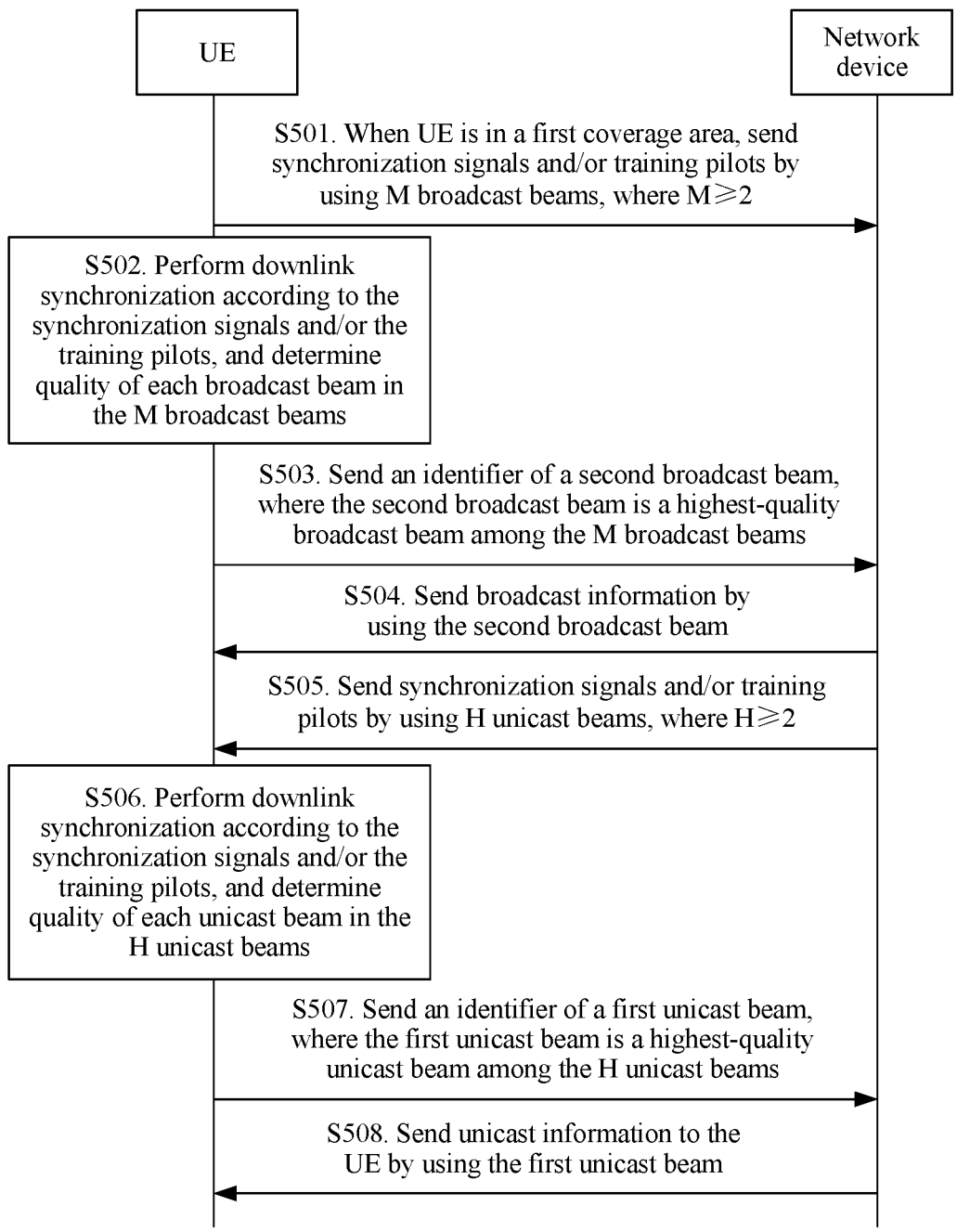
FIG. 12 is a flowchart of Embodiment 5 of an information transmission method according to the present invention.

FIG. 12 is a flowchart of Embodiment 5 of an information transmission method according to the present invention. As shown in FIG. 12, this embodiment is based on any embodiment of Embodiment 1 to Embodiment 4 of the method in the present invention, and the method in this embodiment may include the following steps.

S501. When the UE is in the first coverage area, the network device sends synchronization signals and/or training pilots to the UE by using M broadcast beams, where M≥2.

In this embodiment, when the UE is in the first coverage area, the network device may send the synchronization signals and/or the training pilots to the UE by using the M broadcast beams, where M is an integer greater than or equal to 2.

S502. The UE performs downlink synchronization according to the synchronization signals and/or the training pilots, and determines quality of each broadcast beam in the M broadcast beams. It should be noted that no limitation is imposed on that the UE performs downlink synchronization only according to the synchronization signals and/or the training pilots and determines beam quality. Any other technology that can be used to perform downlink synchronization and determine beam quality applies to the solutions of the present invention.

In this embodiment, the UE may receive, by using the M broadcast beams, the synchronization signals and/or the training pilots that are sent by the network device. Then, the UE may perform downlink synchronization with each broadcast beam according to the synchronization signal and/or the training pilot that is received by using each broadcast beam in the M broadcast beams, and may further determine the quality of each broadcast beam in the M broadcast beams.

S503. The UE sends an identifier of a second broadcast beam to the network device, where the second broadcast beam is a highest-quality broadcast beam among the M broadcast beams.

In this embodiment, after determining the quality of each broadcast beam in the M broadcast beams, the UE may determine the highest-quality broadcast beam from the M broadcast beams. In addition, the highest-quality broadcast beam is referred to as the second broadcast beam. Then, the UE sends the identifier of the second broadcast beam to the network device.

Optionally, after determining the identifier of the second broadcast beam, the UE reports the identifier to the network device.

Optionally, the UE reports the identifier of the second broadcast beam to the network device when the identifier of the second broadcast beam is different from an identifier of a broadcast beam used when the UE currently receives broadcast information. Specifically, after the UE determines the identifier of the second broadcast beam, the UE determines whether the identifier of the second broadcast beam is the same as the identifier of the broadcast beam used when the UE currently receives the broadcast information. When the identifier of the second broadcast beam is the same as the identifier of the broadcast beam used when the UE currently receives the broadcast information, the UE stops sending the identifier of the second broadcast beam to the network device, that is, the UE does not send the identifier of the second broadcast beam to the network device. When the identifier of the second broadcast beam is different from the identifier of the broadcast beam used when the UE currently receives the broadcast information, the UE sends the identifier of the second broadcast beam to the network device.

S504. The network device sends the broadcast information to the UE by using the second broadcast beam.

In this embodiment, the network device receives the identifier of the second broadcast beam sent by the UE, and the network device may determine that the identifier of the second broadcast beam is the highest-quality broadcast beam, received by the UE, among the M broadcast beams. Optionally, the identifier of the second broadcast beam received by the network device is different from an identifier of a broadcast beam used when the network device currently sends broadcast information to the UE. Then, the network device sends the broadcast information to the UE by using the second broadcast beam according to the identifier of the second broadcast beam identifier, and the UE receives, also by using the second broadcast beam, the broadcast information sent by the network device. Therefore, one broadcast beam for communication with the UE is determined from multiple broadcast beams, and transmission reliability of a broadcast beam when the UE is in the first coverage area is implemented.

Optionally, the method in the embodiment may further include the following steps.

S505. The network device sends synchronization signals and/or training pilots to the UE by using H unicast beams, where H≥2.

In this embodiment, after the network device receives an identifier of the second broadcast beam sent by the UE, the network device may send the synchronization signals and/or the training pilots to the UE by using the H unicast beams, where H is an integer greater than or equal to 2. Optionally, divergence azimuths formed when the H unicast beams are emitted from the network device are in a range of a divergence azimuth formed when the first broadcast beam is emitted from the network device. Optionally, the H unicast beams include the service beam of the UE and N adjacent unicast beams, and N is an integer greater than or equal to 1. The service beam of the UE belongs to the unicast beam.

S506. The UE performs downlink synchronization according to the synchronization signals and/or the training pilots, and determines quality of each unicast beam in the H unicast beams.

In this embodiment, the UE may receive, by using the H unicast beams, the synchronization signals and/or the training pilots that are sent by the network device. Then, the UE may perform downlink synchronization with each unicast beam according to the synchronization signal and/or the training pilot that is received by using each unicast beam in the H unicast beams, and may further determine the quality of each unicast beam in the H unicast beams. It should be noted that no limitation is imposed on that the UE performs downlink synchronization only according to the synchronization signals and/or the training pilots and determines beam quality. Any other technology that can be used to perform downlink synchronization and determine beam quality applies to the solutions of the present invention.

S507. The UE sends an identifier of a first unicast beam to the network device, where the first unicast beam is a highest-quality unicast beam among the H unicast beams.

In this embodiment, after determining the quality of each unicast beam in the H unicast beams, the UE may determine the highest-quality unicast beam from the H unicast beams. In addition, the highest-quality unicast beam is referred to as the first unicast beam. Then, the UE sends the identifier of the first unicast beam to the network device.

S508. The network device sends unicast information to the UE by using the first unicast beam.

In this embodiment, the network device receives the identifier of the first unicast beam sent by the UE, and the network device may determine that the first unicast beam is the highest-quality unicast beam, received by the UE, among the H unicast beams. Optionally, the identifier of the first unicast beam received by the network device is different from an identifier of a unicast beam used when the network device currently communicates with the UE. Then, the network device sends the unicast information to the UE by using the first unicast beam according to the identifier of the first unicast beam identifier, and the UE receives, also by using the first unicast beam, the unicast information sent by the network device. Therefore, one unicast beam for communication with the UE is determined from multiple unicast beams, and tracking and measurement of a unicast beam when the UE is in the first coverage area are implemented.

It should be noted that the unicast beam mentioned in S505 to S508 is a downlink unicast beam, and correspondingly, steps similar to S505 to S508 can be used to perform tracking and measurement of an uplink unicast beam, so as to determine a highest-quality uplink unicast beam, and further determine, when the UE is in the first coverage area, a highest-quality unicast beam pair to be used for communication between the UE and the network device.

In this embodiment, when UE is in a first coverage area, a network device sends synchronization signals and/or training pilots to the UE by using multiple broadcast beams, and the UE determines a highest-quality broadcast beam from the multiple broadcast beams and reports the highest-quality broadcast beam to the network device. Therefore, the network device and the UE use the highest-quality broadcast beam for broadcast information transmission, and therefore tracking and measurement of a broadcast beam are implemented. In addition, the network device sends synchronization signals and/or training pilots to the UE by using multiple unicast beams, and the UE determines a highest-quality unicast beam from the multiple unicast beams and reports the highest-quality unicast beam to the network device. Therefore, the network device and the UE use the highest-quality unicast beam for unicast information transmission, and therefore tracking and measurement of a unicast beam are implemented.

Figure 13:
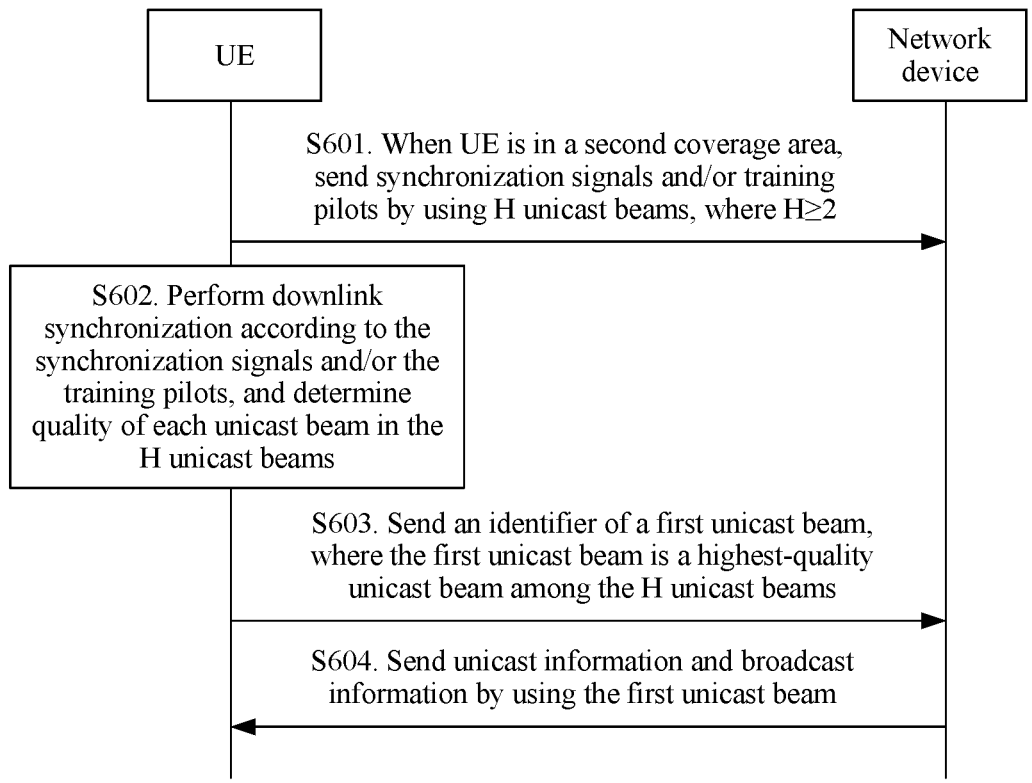
FIG. 13 is a flowchart of Embodiment 6 of an information transmission method according to the present invention.

FIG. 13 is a flowchart of Embodiment 6 of an information transmission method according to the present invention. As shown in FIG. 13, this embodiment is based on any embodiment of Embodiment 1 to Embodiment 5 of the method in the present invention, and the method in this embodiment may include the following steps.

S601. When the UE is in the second coverage area, the network device sends synchronization signals and/or training pilots to the UE by using H unicast beams, where H≥2.

When the UE is in the second coverage area, the UE cannot receive the broadcast beam sent by the network device. Therefore, the unicast beam is described in this embodiment. Optionally, the H unicast beams include the service beam of the UE and N adjacent unicast beams, and N is an integer greater than or equal to 1. The service beam of the UE belongs to the unicast beam.

S602. The UE performs downlink synchronization according to the synchronization signals and/or the training pilots, and determines quality of each unicast beam in the H unicast beams.

S603. The UE sends an identifier of a first unicast beam to the network device, where the first unicast beam is a highest-quality unicast beam among the H unicast beams.

S604. The network device sends the unicast information and the broadcast information to the UE by using the first unicast beam.

For a detailed implementation process of S601 to S604, refer to related descriptions of S505 to S508 in Embodiment 5 of the method in the present invention, and details are not described herein.

It should be noted that when the UE is in the second coverage area, the UE cannot receive the broadcast information that is sent by the network device by using the broadcast beam. Therefore, the network device sends the broadcast information to the UE by using the first unicast beam. "The network device sends the unicast information and the broadcast information to the UE by using the first unicast beam" in S604 indicates that the network device sends the unicast information to the UE by using the first unicast beam at a specific time and the network device sends the broadcast information to the UE by using the first unicast beam at another specific time, or the network device sends the broadcast information and the unicast information to the UE by using the first unicast beam at a same time.

It should be noted that the unicast beam mentioned in S601 to S604 is a downlink unicast beam, and correspondingly, steps similar to S601 to S604 can be used to perform tracking and measurement of an uplink unicast beam, so as to determine a highest-quality uplink unicast beam, and further determine, when the UE is in the second coverage area, a highest-quality unicast beam pair to be used for communication between the UE and the network device.

In this embodiment, when UE is in a second coverage area, a network device sends synchronization signals and/or training pilots to the UE by using multiple unicast beams, and the UE determines a highest-quality unicast beam from the multiple unicast beams and reports the highest-quality unicast beam to the network device. Therefore, the network device and the UE use the highest-quality unicast beam for unicast information transmission, and therefore tracking and measurement of a unicast beam are implemented.

Optionally, in Embodiment 5 or Embodiment 6 of the method in the present invention, transmission of the synchronization signals and/or the training pilots occupies only a part of OFDM symbols of a TTI. For example, a TTI has a width of 14 OFDM symbols; if the H unicast beams are four unicast beams, transmission of the synchronization signals and/or training pilots in the TTI occupies only the beginning four orthogonal frequency division multiplexing technology (Orthogonal Frequency Division Multiplexing, OFDM for short) symbols. In this case, for the TTI for transmission of the synchronization signals and/or training pilots, when receiving data, the UE needs to exclude the beginning four OFDM symbols or exclude resource locations occupied by the synchronization signals and/or the training pilots in the beginning four OFDM symbols.

Based on Embodiment 5 or Embodiment 6 of the method in the present invention, optionally, before executing S505 or S601, the network device may further send, to the UE, configuration information that is for the UE to measure the H unicast beams, where the configuration information includes an identifier and/or a sending time of each unicast beam in the H unicast beams. Correspondingly, the UE receives the configuration information that is sent by the network device and is for the UE to measure the H unicast beams. Then, the UE receives the synchronization signals and/or the training pilots according to the configuration information at the sending time of each unicast beam in the H unicast beams by using a unicast beam corresponding to each identifier.

Optionally, that the UE sends an identifier of a first unicast beam to the network device in S507 or S603 is: after determining the identifier of the first unicast beam, the UE reports the identifier to the network device. Alternatively, when the identifier of the first unicast beam is different from an identifier of a unicast beam used when the UE currently communicates with the network device, the UE reports the identifier of the first unicast beam to the network device. Specifically, after the UE determines the identifier of the first unicast beam, the UE determines whether the identifier of the first unicast beam is the same as the identifier of the unicast beam used when the UE currently communicates with the network device. When the identifier of the first unicast beam is the same as the identifier of the unicast beam used when the UE currently communicates with the network device, the UE stops sending the identifier of the first unicast beam to the network device, that is, the UE does not send the identifier of the first unicast beam to the network device. When the identifier of the first unicast beam is different from the identifier of the unicast beam used when the UE currently communicates with the network device, the UE sends the identifier of the first unicast beam to the network device.

Optionally, that the UE sends an identifier of the first unicast beam to the network device in S507 or S603 includes: the UE sends identifiers of Y unicast beams to the network device in descending order or ascending order of quality, where Y is an integer greater than or equal to 1 and less than or equal to H, that is, sends identifiers of all or some unicast beams of the H unicast beams to the network device; or the UE sends quality ranking information of the Y unicast beams to the network device. The ranking information is, for example, 21345, which indicates that the UE has sent quality ranking information of five unicast beams, where a highest-quality unicast beam is 2, a unicast beam of second highest quality is 1, and so on; or indicates that the UE has sent quality ranking information of five unicast beams, where quality of the first one unicast beam ranks number 2, quality of the second unicast beam ranks number 1 (that is, the quality is the highest), and so on. Correspondingly, the network device receives the identifiers of the Y unicast beams that are sent by the UE in descending order or ascending order of quality, or the network device receives the quality ranking information of the Y unicast beams that is sent by the UE. For example, when the UE sends identifiers of H unicast beams to the network device in descending order of quality, the network device uses the identifier of the first one unicast beam as the identifier of the first unicast beam; when the UE sends identifiers of H unicast beams to the network device in ascending order of quality, the network device uses an identifier of the $H^{th}$ one unicast beam as the identifier of the first unicast beam.

Optionally, after the network device receives the identifier of the first unicast beam sent by the UE, the network device may send first signaling to the UE, where the first signaling includes an identifier of a second unicast beam. For example, the network device may send the first signaling to the UE according to the identifier of the first unicast beam. Alternatively, the network device may send first signaling to the UE according to received identifiers of the H unicast beams that are sent by the UE in descending order or ascending order of quality. The second unicast beam may the same as the first unicast beam, or may be different from the first unicast beam. The second unicast beam may be a unicast beam, except the first unicast beam, in the H unicast beams, or the second unicast beam may be a unicast beam except the H unicast beams. In addition, the network device further switches the service beam of the UE to the second unicast beam. Correspondingly, after sending the identifier of the first unicast beam to the network device, the UE receives the first signaling sent by the network device, and the UE switches the service beam of the UE to the second unicast beam according to the first signaling. Optionally, the first signaling may be dedicated signaling, such as physical layer or Media Access Control (Media Access Control, MAC for short) layer control signaling or a radio resource control (Radio Resource Control, RRC for short) message.

Based on the foregoing method embodiments of the present invention, optionally, after the UE determines that the UE is in the second coverage area, the method further includes: stopping, by the UE, initiating a random access procedure to the network device, or stopping an ongoing random access procedure. The UE in the second coverage area maintains uplink synchronization by using uplink transmission, and if the UE in the second coverage area loses the uplink synchronization, the UE enters a radio link failure state.

Optionally, after the network device determines that the UE is in the first coverage area, the network device sends PRACH configuration information by using one broadcast beam, and the UE receives the PRACH configuration information that is sent by the network device by using one broadcast beam. Then, the UE sends a random access preamble to the network device by using an uplink beam on a time-frequency resource indicated by the PRACH configuration information, where the uplink beam has an association relationship with a broadcast beam through which the UE receives the PRACH configuration information, or a sending direction of the uplink beam is opposite to a sending direction of a broadcast beam used when the network device sends the PRACH configuration information. The network device specifies an association relationship between an uplink beam and a downlink beam, or stipulates their association relationship by using a protocol, for example, stipulates that uplink and downlink beams with a same beam identifier are associated. The random access preamble may be specified by the network device. After the network device receives the random access preamble that is sent by the UE by using the uplink beam on the time-frequency resource indicated by the PRACH configuration information, the network device sends a RAR message to the UE. The RAR message includes an identifier of the random access preamble and uplink authorization information, and the uplink authorization information is used to authorize, to the UE, an uplink time-frequency resource and an uplink beam that are used for communication with the network device. Optionally, the RAR message may further include an identifier of the uplink beam, and may further include uplink timing advance. The uplink beam authorized by the uplink authorization information may be an uplink beam used when the UE sends the random access preamble.

The UE receives the RAR message sent by the network device, and may further determine whether the identifier of the random access preamble included in the RAR message is the same as an identifier of the random access preamble sent by the UE to the network device. If the identifier of the random access preamble included in the RAR message is the same as the identifier of the random access preamble sent by the UE to the network device, the UE sends a random access message 3 to the network device by using the uplink beam authorized by the uplink authorization information and on the uplink time-frequency resource authorized by the uplink authorization information, where the random access message 3 includes identifier information of the UE, so as to uniquely identify the UE. The network device receives the random access message 3 that is sent by the UE by using the uplink beam authorized by the uplink authorization information and on the uplink time-frequency resource authorized by the uplink authorization information. If the identifier of the random access preamble included in the RAR message is different from the identifier of the random access preamble sent by the UE to the network device, the UE continues to send the random access preamble to the network device and continues to receive the RAR message sent by the network device. In a random access procedure, if a quantity of times the UE sends the random access preamble exceeds a preset quantity of times, a random access failure processing procedure is entered.

Optionally, for purposes of UE power saving, a subframe location at which the UE sends the random access message 3 may be determined by using a subframe at which the UE sends the random access preamble. For example, a subframe location at which UE sends a random access message 3 is the first control subframe that is consecutive after seven TTIs are added following a subframe at which the UE sends a random access preamble.

Optionally, that the uplink authorization information is used to authorize, to the UE, an uplink beam that is used for communication with the network device includes: the uplink authorization information is used to authorize the UE to use all uplink beams to communicate with the network device. Because of terminal moving, beam switching may be needed in the random access procedure. To resolve this problem, the uplink authorization information in the random access message 2 may be not limited to an uplink beam through which a terminal sends a random access preamble, and may be extended to that the uplink authorization information in the random access message 2 applies to all uplink beams. For a case in which the uplink authorization information applies to all the uplink beams, the network device needs to reserve radio time-frequency resources for the UE on all uplink beams of a control subframe corresponding to the uplink authorization information, that is, to ensure that the reserved radio time-frequency resources are not allocated to another UE for use. Similarly, for transmission of a dedicated random access preamble specified by the network device for the terminal, an applicable uplink beam may be specified, or the uplink authorization information may apply to all uplink beams.

Figure 14:
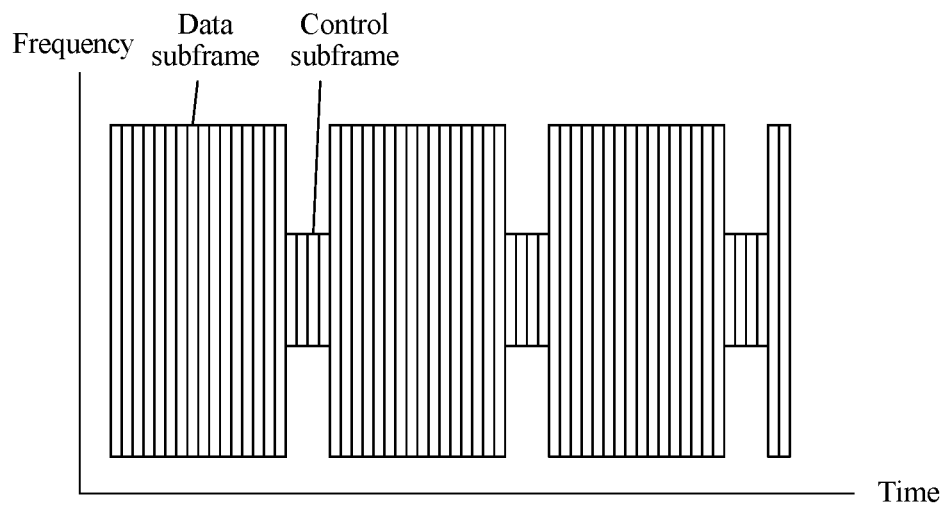
FIG. 14 is a schematic diagram of subframe transmission provided in an embodiment of the present invention.

Optionally, at uplink and downlink data subframes, a base station or the terminal uses a low-power unicast beam for transmission, and transmission coverage of a data subframe may be greater than transmission coverage of a control subframe. Broadcast information such as a primary synchronization signal (Primary Synchronization Signal, PSS for short)/a secondary synchronization signal (Secondary Synchronization Signal, SSS for short), a common reference signal (Common Reference Signal, CRS for short), system information (System Information, SI for short), and a RAR is transmitted at a downlink control subframe, and a random access preamble (Preamble) is transmitted at an uplink control subframe. At a control subframe, the network device or the UE uses a high-power broadcast beam for transmission, and transmission coverage is generally small. Each subframe is one TTI. To avoid excessive downlink control subframe power, transmit frequency bandwidth may be compressed properly, and may be concentrated on a middle band, as shown in FIG. 14, or dispersed to obtain a measurement frequency-selective gain. A time sequence relationship is retransmitted according to a stipulated hybrid automatic repeat request (Hybrid Automatic Repeat Request, HARQ for short). If a subframe that should be used for HARQ retransmission of uplink unicast data transmission is a control subframe, the UE needs to use processing in a manner in which a subframe that should be used for HARQ retransmission in an LTE protocol is a measurement interval, that is, current HARQ retransmission is skipped.

In Embodiment 7 of a method in the present invention, when the UE and the network device need cross-carrier scheduling, the network device sends DCI to the UE in a first TTI of a scheduling cell, where the DCI indicates radio resource allocation information in K consecutive second TTIs of a scheduled cell, and K is an integer greater than or equal to 2. Correspondingly, the UE receives the DCI that is sent by the network device in the first TTI of the scheduling cell. Generally, the first TTI is K times as large as the second TTI.

A TTI in an existing 3rd Generation Partnership Project (3rd Generation Partnership Project, 3GPP for short) Long Term Evolution (Long Term Evolution, LTE for short) LTE system is 1 ms. In a case of millimeter wave band communication, an available frequency band very large, bandwidth of a carrier may reach a GHz level, and still using a TTI of 1 ms leads to a resource waste caused by an excessively large resource granularity. Therefore, in a millimeter wave band, a TTI is less than 1 ms. A millimeter wave band carrier of a TTI of less than 1 ms is used, in a manner of carrier aggregation (Carrier Aggregation, CA for short), as a secondary component carrier, and configured for the UE, and a primary component carrier is a low-band carrier using a TTI of 1 ms. During cross-carrier scheduling, how to perform cross-carrier scheduling on a millimeter wave carrier of less than 1 ms by using a carrier of a TTI of 1 ms needs to be urgently resolved. Therefore, in this embodiment of the present invention, if the first TTI is 1 ms and the second TTI is 0.1 ms, radio resource allocation information in 10 consecutive second TTIs is scheduled in a TTI of 1 ms, thereby resolving the foregoing problem.

Optionally, the radio resource allocation information is indicated according to unified numbers of PRBs in the K consecutive second TTIs. That is, subframes in K consecutive TTIs are classified into one group, and then a frequency band of a millimeter wave cell is divided into Y equal portions (band edges may be not used and not accounted into the Y equal portions). After such processing, K×Y PRBs can be obtained, and then the K×Y PRBs are numbered in a unified manner. If K×Y is 100, unified numbers of the 100 PRBs may be 0 to 99. The DCI indicates the radio resource allocation information in the K consecutive second TTIs of the scheduled cell. That is, the DCI may include numbers 1, 3, 11, 13, . . . , 91, 93, and the DCI indicates PRBs whose scheduling numbers in the K second TTIs are 1, 3, 11, 13, . . . , 91, 93.

Figure 15:
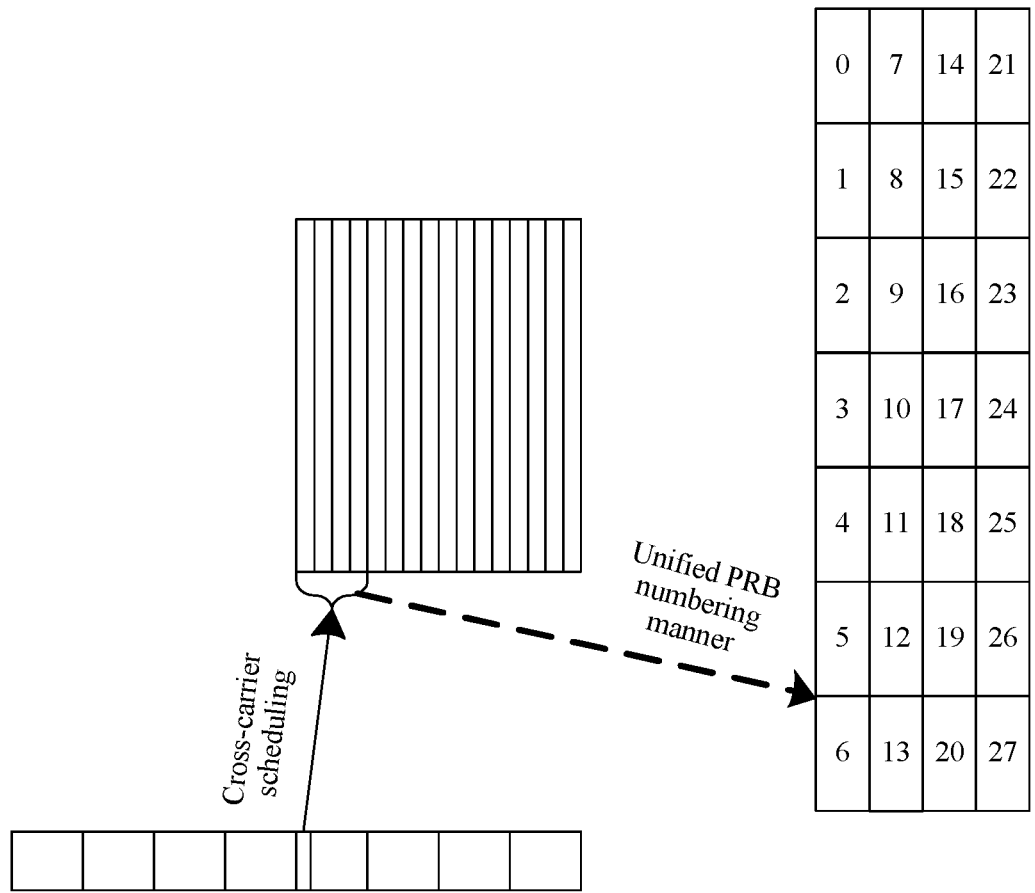
FIG. 15 is a first schematic diagram of unified PRB numbering provided in an embodiment of the present invention.

Optionally, order of the unified numbers of the PRBs in terms of a time domain is ascending order of time. Order of the unified numbers of the PRBs in terms of a frequency domain is descending order of a frequency. As shown in FIG. 15, if the first TTI is four times as large as the second TTI, K is 4, and Y is 7, PRBs in four second TTIs may be numbered.

Figure 16:
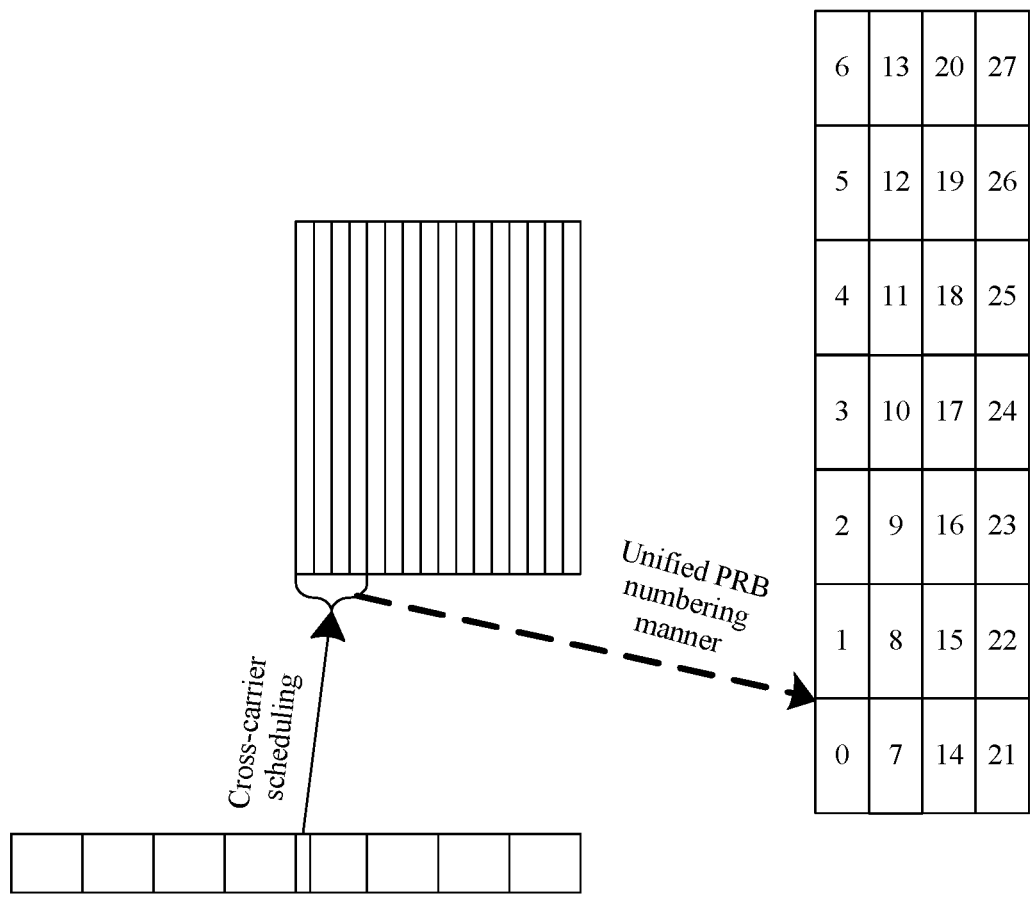
FIG. 16 is a second schematic diagram of unified PRB numbering provided in an embodiment of the present invention.

Optionally, order of the unified numbers of the PRBs in terms of a time domain is ascending order of time. Order of the unified numbers of the PRBs in terms of a frequency domain is ascending order of a frequency. As shown in FIG. 16, if the first TTI is four times as large as the second TTI, K is 4, and Y is 7, PRBs in four second TTIs are numbered.

A manner, provided in this embodiment of the present invention, of numbering radio resources of multiple subframes in a millimeter wave cell in a unified manner, and scheduling multiple millimeter wave subframes by using one piece of conventional downlink control information also applies to a millimeter wave self-scheduling scenario. This can further reduce resource downlink control information overheads and save UE power consumption.

Optionally, one piece of DCI of an existing cell of LTE can be used to schedule multi-TTI transmission in a millimeter wave cell as long as a maximum PRB number is not greater than 100. If the maximum PRB number is greater than 100, a new DCI format needs to be introduced to support scheduling of a larger PRB quantity. For such a case in which one piece of DCI is used to schedule K consecutive subframes, the scheduled PRB may belong to multiple second TTIs. Generally, one transport block (Transport Block, TB for short) is transmitted on all scheduled PRBs in only one TTI. One TB needs one HARQ feedback. Because an existing cell of LTE supports cross-carrier scheduling of a maximum of four other cells and each scheduled cell has a maximum of one HARQ feedback, in this case, the HARQ feedback can be processed in a similar way of cross-carrier scheduling of multiple secondary cells SCells. If TTIs of the conventional LTE cell exceed four times of TTIs of a millimeter wave cell scheduled by the conventional LTE cell, a resource used for a HARQ feedback in the conventional LTE cell needs to be expanded, or a quantity of cells that can perform cross-carrier scheduling can be expanded.

Figure 17:
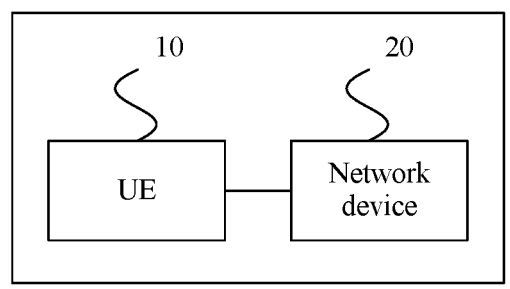
FIG. 17 is a schematic structural diagram of an embodiment of an information transmission system according to the present invention.

FIG. 17 is a schematic structural diagram of an embodiment of an information transmission system according to the present invention. As shown in FIG. 17, the system in this embodiment includes UE 10 and a network device 20. The UE 10 and the network device 20 are communicatively connected. The UE 10 may use a structure of any apparatus embodiment of FIG. 1 to FIG. 3, and correspondingly, may execute the technical solutions executed by the UE in the foregoing method embodiments of the present invention, implementation principles and technical effects thereof are similar, and details are not described herein. The network device 20 may use a structure of any apparatus embodiment of FIG. 4 to FIG. 6, and correspondingly, may execute the technical solutions executed by the network device in the foregoing method embodiments of the present invention, implementation principles and technical effects thereof are similar, and details are not described herein.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (English: Read-Only Memory, ROM for short), a random access memory (English: Random Access Memory, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A user equipment (UE), comprising:
a processor, configured to determine a type of a coverage area in which the UE is located, wherein the type of the coverage area is a first coverage area or a second coverage area, the first coverage area is an area that is covered by a broadcast beam from a network device, the broadcast beam is a beam used when network device sends broadcast information in a broadcast manner, the second coverage area is an area that is not covered by the broadcast beam from the network device and that is in an area that is covered by a unicast beam from the network device, and the unicast beam is a beam used when the network device communicates with the UE in a unicast manner; and a transceiver, configured to receive the broadcast information from the network device over the broadcast beam when the UE is located in the first coverage area and over the unicast beam when the UE is located in the second coverage area, wherein the transceiver is configured to: receive, by using the broadcast beam, the broadcast information from the network device when the type of the coverage area determined by the processor is the first coverage area; or receive, by using the unicast beam, the broadcast information from the network device when the type of the coverage area determined by the processor is the second coverage area, wherein a divergence angle of the unicast beam is not greater than a divergence angle of the broadcast beam, and wherein the transceiver is further configured to: after the processor determines that the UE is in the first coverage area, receive physical random access channel (PRACH) configuration information over one broadcast beam; send a random access preamble by using an uplink beam on a time-frequency resource indicated by the PRACH configuration information, wherein the uplink beam has an association relationship with the broadcast beam or a sending direction of the uplink beam is opposite to a sending direction of the broadcast beam; receive a random access response (RAR) message from the network device, wherein the RAR message comprises an identifier of the random access preamble and uplink authorization information, and the uplink authorization information is used to authorize an uplink time-frequency resource and an uplink beam that are used for communication with the network device; and send a random access message 3 by using the uplink beam authorized by the uplink authorization information and on the uplink time-frequency resource authorized by the uplink authorization information, wherein the random access message 3 comprises identifier information of the UE.

2. The UE according to claim 1, wherein the processor is configured to: determine that the UE is in the second coverage area when quality of a service beam or a first broadcast beam of the UE is less than a preset threshold; or determine that the UE is in the first coverage area when quality of a service beam or a first broadcast beam of the UE is greater than or equal to a preset threshold; wherein the first broadcast beam is a highest-quality broadcast beam among all broadcast beams currently received by the UE.

3. The UE according to claim 2, wherein the transceiver is further configured to: after the processor determines the type of the coverage area in which the UE is located, when the processor determines that the type of the coverage area in which the UE is located changes, send first indication information to the network device, wherein the first indication information is used to indicate a type of a coverage area in which the UE is currently located or indicate that the type of the coverage area in which the UE is located changes.

4. The UE according to claim 1, wherein the transceiver is further configured to: before the processor determines the type of the coverage area in which the UE is located, receive second indication information from the network device, wherein the second indication information is used to indicate a type of a coverage area in which the UE is currently located or indicate that the type of the coverage area in which the UE is located changes.

5. The UE according to claim 4, wherein the transceiver is further configured to: before receiving the second indication information from the network device, send quality of a service beam or a first broadcast beam to the network device, wherein the first broadcast beam is a highest-quality broadcast beam among all broadcast beams currently received by the UE.

6. The UE according to claim 2, wherein the transceiver is further configured to: when the processor determines that the UE is in the first coverage area, receive synchronization signals and/or training pilots that are from the network device by using M broadcast beams, wherein M is an integer greater than or equal to 2;

the processor is further configured to perform downlink synchronization, and determine quality of each broadcast beam in the M broadcast beams;

the transceiver is further configured to send an identifier of a second broadcast beam to the network device, wherein the second broadcast beam is a highest-quality broadcast beam among the M broadcast beams; and the transceiver is configured to receive, by using the second broadcast beam, the broadcast information from the network device.

7. The UE according to claim 1, wherein the transceiver is further configured to: when the processor determines that the UE is in the second coverage area, receive synchronization signals and/or training pilots that are from the network device by using H unicast beams, wherein H is an integer greater than or equal to 2;

the processor is further configured to perform downlink synchronization, and determine quality of each unicast beam in the H unicast beams;

the transceiver is further configured to: send an identifier of a first unicast beam to the network device, wherein the first unicast beam is a highest-quality unicast beam among the H unicast beams; and receive, by using the first unicast beam, unicast information from the network device; and the transceiver is configured to receive, by using the first unicast beam, the broadcast information from the network device.

8. The UE according to claim 1, wherein the processor is further configured to: after determining that the UE is in the second coverage area, stop initiating a random access procedure to the network device, or stop an ongoing random access procedure.

9. The UE according to claim 1, wherein the transceiver is further configured to: when the UE and the network device need cross-carrier scheduling, receive downlink control information (DCI) that is from the network device in a first transmission time interval (TTI) of a scheduling cell, wherein the DCI indicates radio resource allocation information in K consecutive second TTIs of a scheduled cell, and K is an integer greater than or equal to 2.

10. A network device, comprising:
a processor, configured to determine a type of a coverage area in which user equipment (UE) is located, wherein the type of the coverage area is a first coverage area or a second coverage area, the first coverage area is an area that is covered by a broadcast beam sent by the network device, the broadcast beam is a beam used when the network device sends broadcast information in a broadcast manner, the second coverage area is an area that is not covered by the broadcast beam sent by the network device and that is in an area that is covered by a unicast beam sent by the network device, and the unicast beam is a beam used when the network device communicates with the UE in a unicast manner; and a transceiver, configured to send the broadcast information to the UE by using a corresponding beam according to the type, determined by the processor, of the coverage area in which the UE is located, wherein the transceiver is configured to: send the broadcast information to the UE by using the broadcast beam when the processor determines that the type of the coverage area is the first coverage area; or send the broadcast information to the UE by using the unicast beam when the processor determines that the type of the coverage area is the second coverage area, wherein a divergence angle of the unicast beam is not greater than a divergence angle of the broadcast beam, and wherein the transceiver is further configured to: after the processor determines that the UE is in the first coverage area, send physical random access channel (PRACH) configuration information by using one broadcast beam; receive a random access preamble that is sent by the UE by using an uplink beam on a time-frequency resource indicated by the PRACH configuration information, wherein the uplink beam has an association relationship with the broadcast beam or a sending direction of the uplink beam is opposite to a sending direction of the broadcast beam; send a random access response (RAR) message to the UE, wherein the RAR message comprises an identifier of the random access preamble and uplink authorization information, and the uplink authorization information is used to authorize, to the UE, an uplink time-frequency resource and an uplink beam that are used for communication with the network device; and receive a random access message 3 that is sent by the UE by using the uplink beam authorized by the uplink authorization information and on the uplink time-frequency resource authorized by the uplink authorization information, wherein the random access message 3 comprises identifier information of the UE.

11. The network device according to claim 10, wherein the transceiver is further configured to: before the processor determines the type of the coverage area in which the UE is located, receive first indication information sent by the UE, wherein the first indication information is used to indicate a type of a coverage area in which the UE is currently located or indicate that the type of the coverage area in which the UE is located changes.

12. The network device according to claim 10, wherein the processor is configured to: determine that the UE is in the second coverage area when quality of a service beam or a first broadcast beam of the UE is less than a preset threshold; or determine that the UE is in the first coverage area when quality of a service beam or a first broadcast beam of the UE is greater than or equal to a preset threshold; wherein the first broadcast beam is a highest-quality broadcast beam among all broadcast beams currently received by the UE.

13. The network device according to claim 10, wherein the transceiver is further configured to: when the processor determines that the UE is in the first coverage area, send synchronization signals and/or training pilots to the UE by using M broadcast beams, wherein M is an integer greater than or equal to 2; and receive an identifier of a second broadcast beam sent by the UE, wherein the second broadcast beam is a highest-quality broadcast beam among the M broadcast beams; and the transceiver is configured to send the broadcast information to the UE by using the second broadcast beam.

14. The network device according to claim 10, wherein the transceiver is further configured to: when the processor determines that the UE is in the second coverage area, send synchronization signals and/or training pilots to the UE by using H unicast beams, wherein H is an integer greater than or equal to 2; receive an identifier of a first unicast beam sent by the UE, wherein the first unicast beam is a highest-quality unicast beam among the H unicast beams; and send unicast information to the UE by using the first unicast beam; and the transceiver is configured to send the broadcast information to the UE by using the first unicast beam.

15. The network device according to claim 10, wherein the transceiver is further configured to: when the UE and the network device need cross-carrier scheduling, send downlink control information (DCI) to the UE in a first transmission time interval (TTI) of a scheduling cell, wherein the DCI indicates radio resource allocation information in K consecutive second TTIs of a scheduled cell, and K is an integer greater than or equal to 2.

16. The network device according to claim 15, wherein the first TTI is K times as large as the second TTI.

17. The network device according to claim 15, wherein the radio resource allocation information is indicated according to unified numbers of physical resource blocks PRBs in the K consecutive second TTIs.

* * * * *